(12) United States Patent
Lee et al.

(10) Patent No.: US 12,452,793 B2
(45) Date of Patent: Oct. 21, 2025

(54) ELECTRONIC DEVICE AND METHOD FOR CONTROLLING TRANSMIT POWER

(71) Applicant: Samsung Electronics Co., Ltd., Suwon-si (KR)

(72) Inventors: Youngmin Lee, Suwon-si (KR); Hyoseok Na, Suwon-si (KR); Jaejin Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 17/946,503

(22) Filed: Sep. 16, 2022

(65) Prior Publication Data

US 2023/0118590 A1    Apr. 20, 2023

Related U.S. Application Data

(63) Continuation of application No. PCT/KR2022/012148, filed on Aug. 12, 2022.

(30) Foreign Application Priority Data

Oct. 15, 2021    (KR) .................. 10-2021-0137211

(51) Int. Cl.
   *H04W 52/14*   (2009.01)
   *H04L 27/26*   (2006.01)
   *H04W 52/42*   (2009.01)
(52) U.S. Cl.
   CPC ..... *H04W 52/146* (2013.01); *H04L 27/26025* (2021.01); *H04W 52/42* (2013.01)
(58) Field of Classification Search
   None
   See application file for complete search history.

(56) References Cited

U.S. PATENT DOCUMENTS

| | | | |
|---|---|---|---|
| 9,729,107 | B2 | 8/2017 | Nobbe et al. |
| 10,278,136 | B2 | 4/2019 | Nory et al. |
| 10,785,006 | B2 | 9/2020 | Jo et al. |

(Continued)

FOREIGN PATENT DOCUMENTS

| | | |
|---|---|---|
| CN | 107888349 A | 4/2018 |
| KR | 10-2018-0131546 A | 12/2018 |

(Continued)

OTHER PUBLICATIONS

International Search Report dated Nov. 18, 2022 for PCT/KR2022/012148.

*Primary Examiner* — Anh Ngoc M Nguyen
(74) *Attorney, Agent, or Firm* — Nixon & Vanderhye P.C.

(57) ABSTRACT

An electronic device include an antenna, a power amplifier and at least one processor configured to identify, transmit power of user data to be transmitted within a first slot in which uplink transmission is initiated; switch, based on identifying that the user data is transmitted based on a first SCS, supply voltage for dynamic range of the PA to a voltage value corresponding to the Tx power; switch, based on identifying that the user data is transmitted based on a second SCS greater than the first SCS, the supply voltage to the voltage value, within second duration in the second slot, the second duration in the second slot being before an initiation of the first slot; and transmit, using the PA, the user data with the Tx power within the first slot, to the base station.

20 Claims, 21 Drawing Sheets

(56) References Cited

U.S. PATENT DOCUMENTS

| | | | |
|---|---|---|---|
| 11,368,941 B2 | 6/2022 | MolavianJazi et al. | |
| 2006/0246857 A1* | 11/2006 | Grillo | H03G 3/004 |
| | | | 455/127.1 |
| 2020/0162032 A1 | 5/2020 | Ripley et al. | |
| 2020/0336111 A1 | 10/2020 | Khlat | |
| 2021/0211987 A1 | 7/2021 | MolavianJazi et al. | |
| 2021/0265953 A1* | 8/2021 | Khlat | H03F 3/195 |

FOREIGN PATENT DOCUMENTS

| | | |
|---|---|---|
| KR | 10-2019-0119381 | 10/2019 |
| KR | 10-2020-0016522 A | 2/2020 |
| KR | 10-2081944 B1 | 2/2020 |
| KR | 10-2021-0016679 A | 2/2021 |
| KR | 10-2021-0033344 | 3/2021 |
| WO | WO2010067766 A1 | 6/2010 |

* cited by examiner

ELECTRONIC DEVICE AND METHOD FOR CONTROLLING TRANSMIT POWER

CROSS-REFERENCE TO RELATED APPLICATIONS

This application is a continuation of International Application No. PCT/KR2022/012148 designating the United States, filed on Aug. 12, 2022, in the Korean Intellectual Property Receiving Office and claiming priority to Korean Patent Application No. 10-2021-0137211, filed on Oct. 15, 2021, the disclosures of which are incorporated by reference herein in their entireties.

BACKGROUND

Field

Various example embodiments of this invention relate to an electronic device and/or a method for controlling transmit power.

Description of Related Art

Unlike a long term evolution (LTE), a new radio (NR) for a fifth generation (5G) cellular communication is being standardized for an enhanced mobile broadband (eMBB), an ultra-reliable and low latency communications (URLLC), and a massive machine-type communications (mMTC). For example, the NR standard supports multiple single subcarrier spacing (SCS)s, unlike the LTE standard that supports single subcarrier spacing (SCS). For example, the NR standard supports SCS of 30 kilo hertz (kHz), SCS of 60 kHz, SCS of 120 kHz, and SCS of 240 kHz, as well as SCS of 15 kHz.

SUMMARY

According to an example embodiment, an electronic device may comprise an antenna, a power amplifier (PA) connected with the antenna and at least one processor, operably coupled with the PA, configured to identify, based on control information received from a base station, transmit (Tx) power of user data to be transmitted within a first slot in which uplink (UL) transmission is initiated; switch, based on identifying that the user data is transmitted based on a first subcarrier spacing (SCS), supply voltage for dynamic range of the PA to a voltage value corresponding to the Tx power, within first duration from first timing in a second slot rightly before the first slot to second timing in the first slot; switch, based on identifying that the user data is transmitted based on a second SCS greater than the first SCS, the supply voltage to the voltage value, within second duration in the second slot, the second duration in the second slot being before an initiation of the first slot; and transmit, using the PA operating based on the supply voltage switched to the voltage value, the user data with the Tx power within the first slot, to the base station.

According to an example embodiment, an electronic device may comprise an antenna, a power amplifier (PA) operably coupled with the antenna and at least one processor, operably coupled with the PA, configured to identify, based on control information received from a base station, a slot in which user data is to be transmitted and transmit (Tx) power of the user data; maintain, based on identifying that the user data is transmitted based on a first subcarrier spacing (SCS), supply voltage for dynamic range of the PA above a first voltage value, within at least one slot before the slot; maintain, based on identifying that the user data is transmitted based on a second SCS greater than the first SCS, the supply voltage above a second voltage value higher than the first voltage value; switch the supply voltage that is maintained above the first voltage value or the second voltage value to a third voltage value corresponding to the Tx power; and transmit, using the PA operating based on the supply voltage switched to the third voltage value, the user data with the Tx power within the slot, to the base station.

According to an example embodiment, an electronic device may comprise an antenna, a power amplifier (PA) operably coupled with the antenna and at least one processor, operably coupled with the PA, configured to identify, based on control information received from a base station, a first slot in which user data is to be transmitted based on a subcarrier spacing (SCS) exceeding 15 kilo hertz (kHz); initiate switching supply voltage for dynamic range of the PA to a voltage value corresponding to transmit (Tx) power of the user data at a first timing in a second slot rightly before the first slot on a condition that the first slot is not a slot in which uplink (UL) transmission is initiated; and initiate switching the supply voltage to the voltage value corresponding to the Tx power at a second timing in the second slot on a condition that the first slot is a slot UL transmission is initiated, wherein the second timing in the second slot is before the first timing.

DETAILED DESCRIPTION

Figure 1:
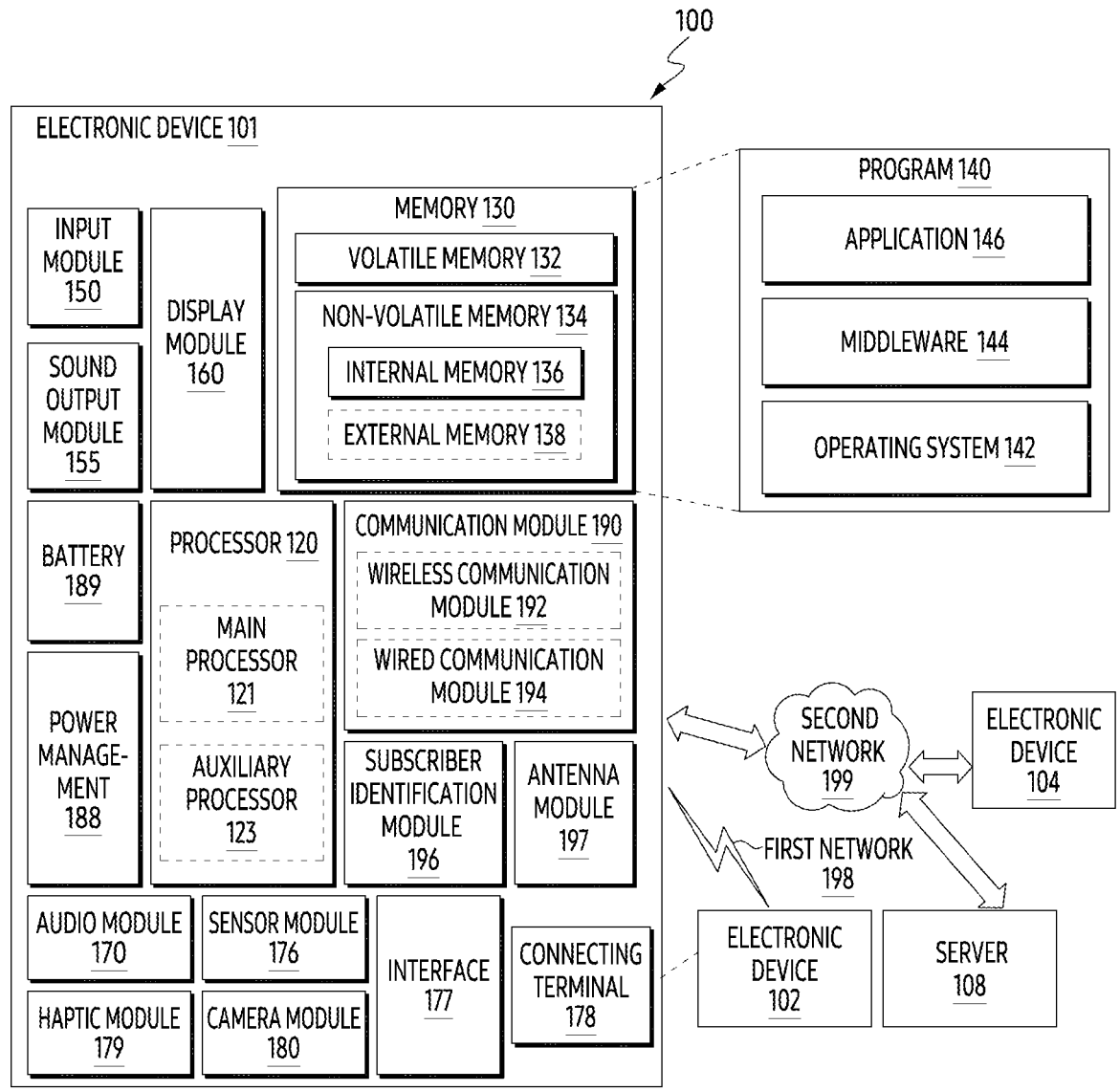
FIG. 1 is a block diagram of an electronic device in a network environment according to various example embodiments.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa.

According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
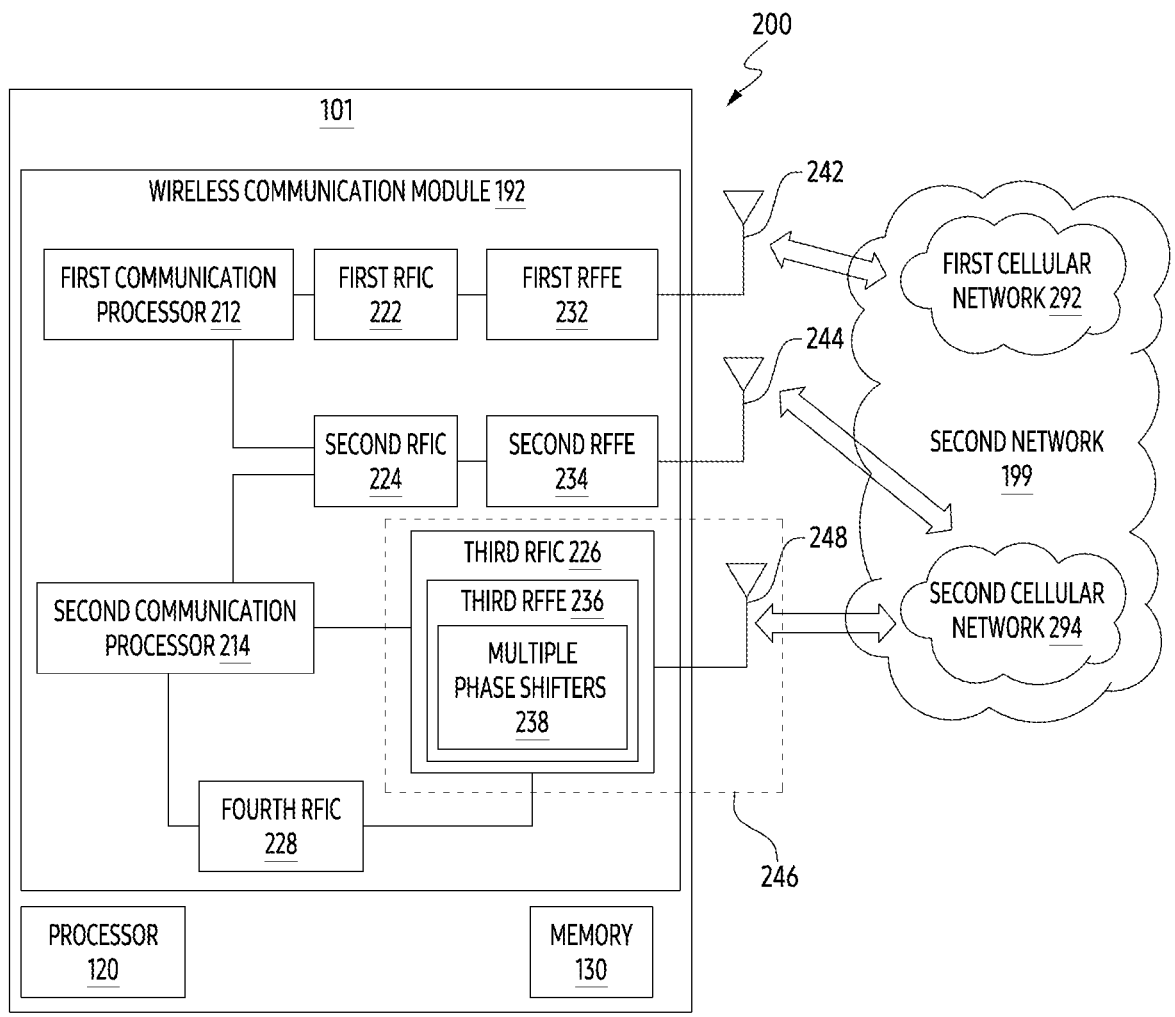
FIG. 2 is a block diagram of an electronic device for supporting legacy network communication and 5G network communication according to various example embodiments.

FIG. 2 is a block diagram 200 of the electronic device 101 for supporting legacy network communication and 5G network communication, according to various embodiments. Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel According to various embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel According to an embodiment, the first communication processor 212 and the second communication processor 214 may be implemented in a single chip or a single package. According to various embodiments, the first communication processor 212 or the second communication processor 214 may be formed with the processor 120, the coprocessor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 130 (e.g., see FIGS. 1-2) and may be accessed by other components (e.g., the processor 120, the first communication processor 212, or the second communication processor 214).

Figure 3:
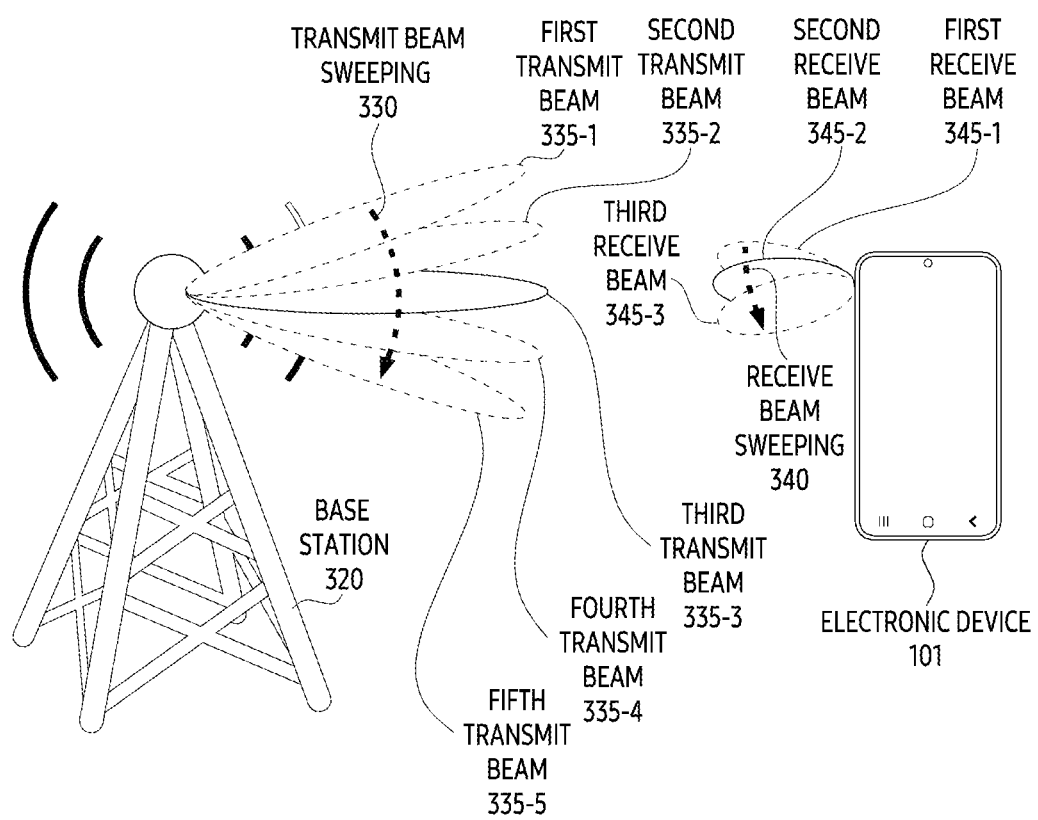
FIG. 3 illustrates an example embodiment of an operation for wireless communication connection between a base station and an electronic device in the second network of FIG. 2, which uses a directional beam for wireless connection.

FIG. 3 illustrates an example embodiment of an operation for wireless communication connection between a base station 320 and the electronic device 101 by using a directional beam for wireless connection in the second network 199 (e.g., the 5G network) of FIG. 2. First, the base station (gNodeB (gNB), transmission reception point (TRP)) 320 may perform a beam detection operation with the electronic device 101 for wireless communication connection. In the illustrated embodiment, for beam detection, the base station 320 may sequentially transmit a plurality of transmit beams, for example, first to fifth transmit beams 335-1, 335-2, 335-3, 335-4, and 335-5 having different directions, thereby making it possible to perform at least one transmit beam sweeping 330.

The first to fifth transmit beams 335-1, 335-2, 335-3, 335-4, and 335-5 may include at least one synchronization sequences (SS)/physical broadcast channel (PBCH) block (SS/PBCH Block). The SS/PBCH Block may be used to periodically measure a channel or beam strength of the electronic device 101.

In another example embodiment, the first to fifth transmit beams 335-1, 335-2, 335-3, 335-4, and 335-5 may include at least one channel state information-reference signal (CSI-RS). The CSI-RS is a reference signal that the base station 320 may set flexibly and may be transmitted periodically, semi-persistently or aperiodically. The electronic device 101 may measure a channel or beam strength by using the CSI-RS.

The transmit beams may form a radiation pattern having a selected beam width. For example, the transmit beams may have a broad radiation pattern having a first beam width or a sharp radiation pattern having a second beam width shaper than the first beam width. For example, transmit beams including SS/PBCH block may have a broader radiation pattern than transmit beams including CSI-RS.

The electronic device 101 may perform receive beam sweeping 340 while the base station 320 performs the transmit beam sweeping 330. For example, while the base station 320 performs first transmit beam sweeping 330, the electronic device 101 may fix a first receive beam 345-1 in a first direction to receive a signal of an SS/PBCH block transmitted in at least one of the first to fifth transmit beams 335-1, 335-2, 335-3, 335-4, and 335-5. While the base station 320 performs second transmit beam sweeping 330, the electronic device 101 may fix a second receive beam 345-2 in a second direction to receive a signal of an SS/PBCH block transmitted in one or more of the first to fifth transmit beams 335-1, 335-2, 335-3, 335-4, and 335-5. In this way, the electronic device 101 may select a communicable receive beam (e.g., the second receive beam 345-2) and a communicable transmit beam (e.g., the third transmit beam 335-3) based on at least the result of the signal reception operation through the receive beam sweeping 340.

As described above, after the communicable transmit and receive beams are determined, the base station 320 and the electronic device 101 may transmit and/or receive basic information for cell setting, and based on the information, set information for additional beam operation. For example, the beam operation information may include detailed information on a set beam, SS/PBCH Block, CSI-RS, or setting information on an additional reference signal.

In addition, the electronic device 101 may continuously monitor the channel and the strength of the beam by using at least one of the SS/PBCH Block and CSI-RS included in the transmit beam. The electronic device 101 may adaptively select a beam having good beam quality by using the monitoring operation. Optionally, when a communication is disconnected due to movement of the electronic device 101 or blocking of a beam, the above-mentioned beam sweeping operation may be performed again to determine a communicable beam.

Figure 4:
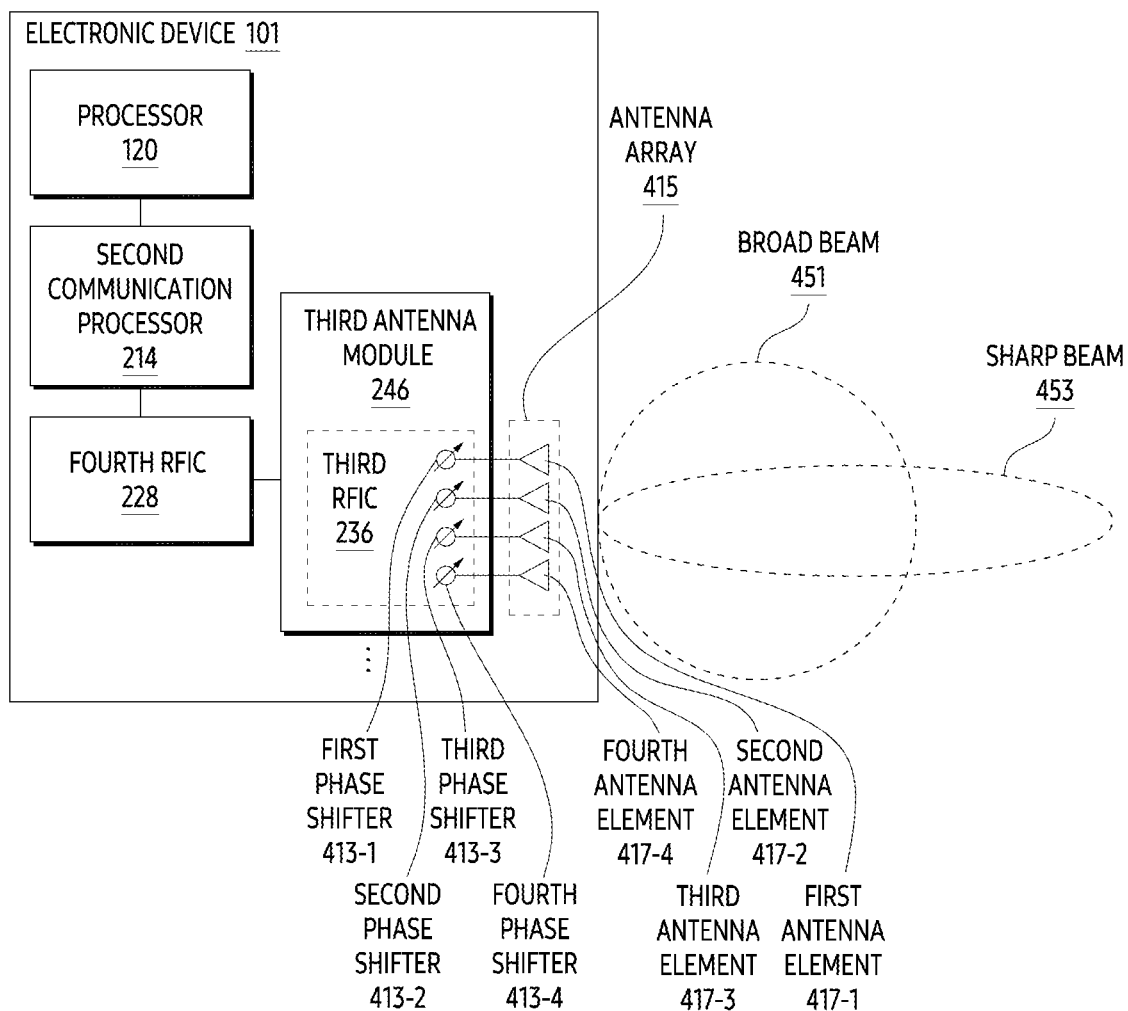
FIG. 4 is a block diagram of an electronic device for 5G network communication according to an example embodiment.

FIG. 4 illustrates a block diagram of the electronic device 101 for 5G network communication, according to an example embodiment. The electronic device 101 may include various components illustrated in FIG. 2; however, for brief description, FIG. 4 illustrates the electronic device 101 as including the processor 120, the second communication processor 214, the fourth RFIC 228, and at least one third antenna module 246.

In the illustrated embodiment, the third antenna module 246 may include first to fourth phase shifters 413-1 to 413-4 (e.g., the phase shifter 238 in FIG. 2) and/or first to fourth antenna elements 417-1 to 417-4 (e.g., the antenna 248 in FIG. 2). Each of the first to fourth antenna elements 417-1 to 417-4 may be electrically connected to one of the first to fourth phase shifters 413-1 to 413-4 individually. The first to fourth antenna elements 417-1 to 417-4 may form at least one antenna array 415.

The second communication processor 214 may control the first to fourth phase shifters 413-1 to 413-4, thereby controlling the phases of the transmitted and/or received signals through the first to fourth antenna elements 417-1 to 417-4, which makes it possible to generate a transmit beam and/or a receive beam in a selected direction.

According to an example embodiment, the third antenna module 246 may form a broad beam 451 of the broad radiation pattern (hereinafter, referred to as a 'broad beam') or a beam 453 of the sharp radiation pattern (hereinafter, referred to as a 'sharp beam') as mentioned above, depending on the number of the used antenna elements. For example, the third antenna module 246 may form the sharp beam 453 when all of the first to fourth antenna elements 417-1 to 417-4 are used, and form the broad beam 451 when only the first antenna element 417-1 and the second antenna element 417-2 are used. The broad beam 451 has a broader coverage than the sharp beam 453, but has a small antenna gain, and thus it may be more effective in searching for a beam. On the other hand, the sharp beam 453 has a narrower coverage than the broad beam 451, but has a higher antenna gain, and thus it may improve communication performance.

According to an example embodiment the second communication processor 214 may utilize a sensor module 176 (e.g., a 9-axis sensor, grip sensor, or GPS) for beam search. For example, the electronic device 101 may adjust a beam search position and/or a beam search period based on the position and/or movement of the electronic device 101 by using the sensor module 176. For another example, when the electronic device 101 is gripped by a user, an antenna module having better communication performance may be selected from among the plurality of third antenna modules 246 by identifying the gripping part of the user using a grip sensor.

Figure 5:
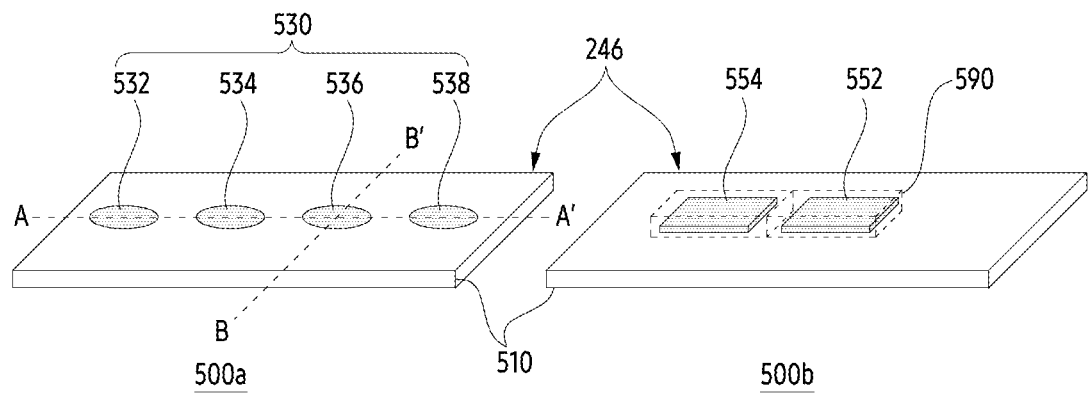
FIG. 5 illustrates an example embodiment of a structure of a third antenna module of FIG. 2.
Figure 5:
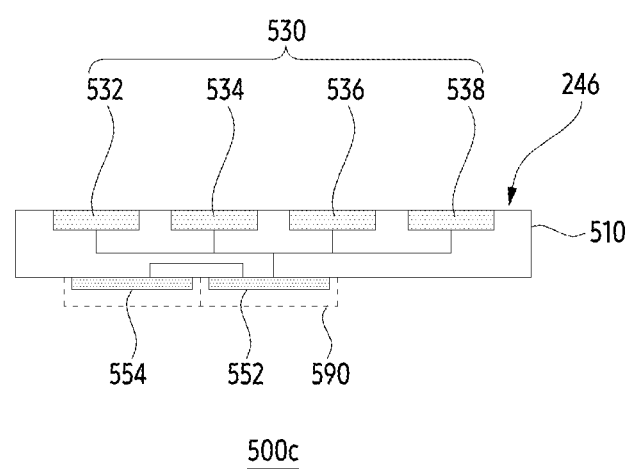

FIG. 5 illustrates, for example, an embodiment of a structure of the third antenna module 246 described with reference to FIG. 2. 500a of FIG. 5 is a perspective view of the third antenna module 246 as viewed from one side, and 500b of FIG. 5 is a perspective view of the third antenna module 246 as viewed from the other side. 500c of FIG. 5 is a cross-sectional view of A-A' of the third antenna module 246.

Referring to FIG. 5, in an embodiment, the third antenna module 246 may include a printed circuit board 510, an antenna array 530, a radio frequency integrated circuit (RFIC) 552, and a power manage integrated circuit (PMIC) 554, and a module interface (not shown). The third antenna module 246 may further optionally include a shielding member 590. In other embodiments, at least one of the aforementioned parts may be omitted, or at least two of the parts may be integrally formed.

The printed circuit board 510 may include a plurality of conductive layers and a plurality of non-conductive layers alternately stacked with the conductive layers. The printed circuit board 510 may provide electrical connection between various electronic components disposed on the printed circuit board 510 and/or outside, by using wires and conductive vias formed on the conductive layer.

The antenna array 530 (e.g., 248 in FIG. 2) may include a plurality of antenna elements 532, 534, 536, and 538 arranged to form a directional beam. The antenna elements may be formed on a first surface of the printed circuit board 510 as illustrated. According to another embodiment, the antenna array 530 may be formed inside the printed circuit board 510. According to embodiments, the antenna array 530 may include a plurality of antenna arrays (e.g., a dipole antenna array and/or a patch antenna array) of the same or different shape or type.

The RFIC 552 (e.g., the third RFIC 226 in FIG. 2) may be disposed in another region of the printed circuit board 510 (e.g., a second surface opposite to the first surface), spaced apart from the antenna array 530. The RFIC 552 may be configured to process a signal of a selected frequency band that is transmitted and received via the antenna array 530. According to an embodiment, upon transmission, the RFIC 552 may convert a baseband signal obtained from a communication processor (not illustrated) into an RF signal of a specified band. Upon reception, the RFIC 552 may convert an RF signal received via the antenna array 530 into a baseband signal and transmit the converted signal to the communication processor.

According to another embodiment, upon transmission, the RFIC 552 may up-convert an IF signal (e.g., approximately 7 GHz to approximately 13 GHz) obtained from an intermediate frequency integrated circuit (IFIC) (e.g., the fourth RFIC 228 in FIG. 2) into the RF signal of the selected band. Upon reception, the RFIC 552 may down-convert the RF signal obtained via the antenna array 530 into an IF signal, and transmit the converted signal to the IFIC.

The PMIC 554 may be disposed in another partial region (e.g., the second surface) of the printed circuit board 510, spaced apart from the antenna array. The PMIC 554 may receive a voltage from a main PCB (not shown) and provide power required for various components (e.g., the RFIC 552) on antenna modules.

The shielding member 590 may be disposed on a part (e.g., the second surface) of the printed circuit board 510 in order to electromagnetically shield at least one of the RFIC 552 and the PMIC 554. According to an embodiment, the shielding member 590 may include a shield can.

Although not illustrated, in various embodiments, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 552 and/or the PMIC 554 of the third antenna module 246 may be electrically connected to the printed circuit board.

Figure 6:
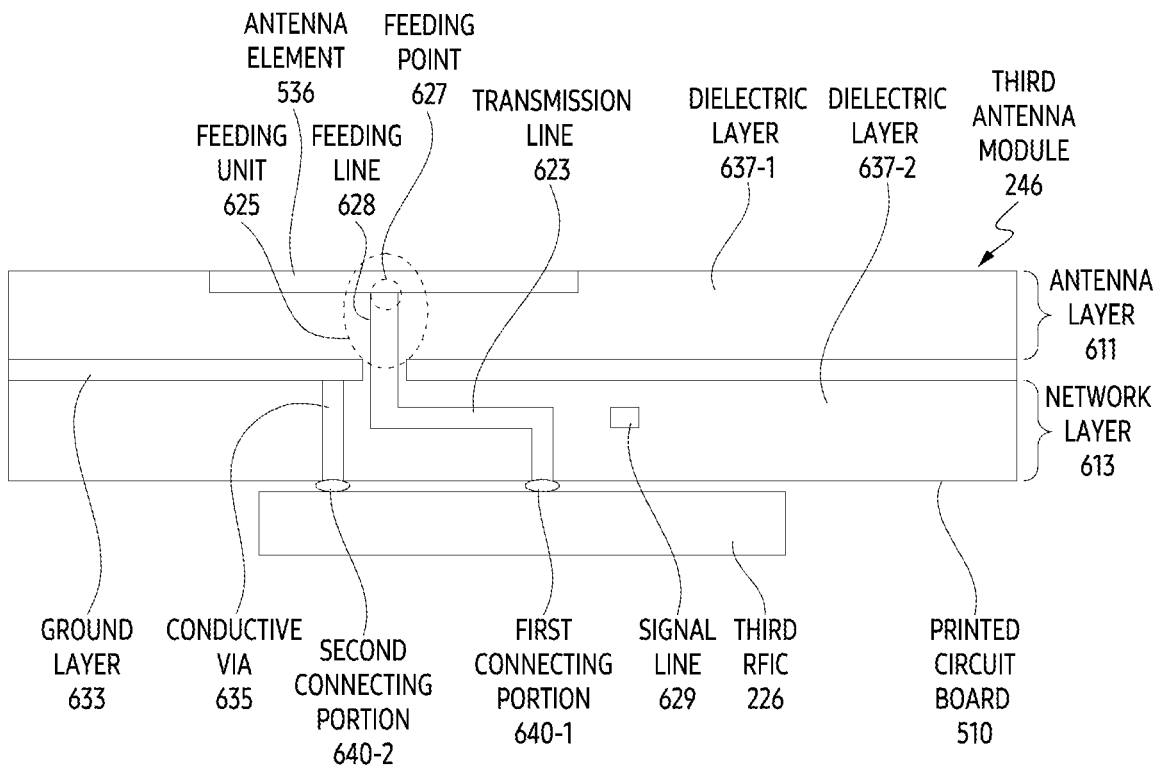
FIG. 6 illustrates a cross-section view of a line B-B' of a third antenna module of FIG. 5.

FIG. 6 illustrates a cross-section taken along line B-B' of the third antenna module 246 of 500a of FIG. 5. A printed circuit board 510 of the illustrated embodiment may include an antenna layer 611 and a network layer 613.

The antenna layer 611 may include at least one dielectric layer 637-1, and an antenna element 536 and/or a feeding unit 625 formed on the outer surface of or inside of the dielectric layer. The feeding unit 625 may include a feeding point 627 and/or a feeding line 628.

The network layer 613 may include at least one dielectric layer 637-2, at least one ground layer 633 formed on the outer surface of or inside of the dielectric layer, at least one conductive via 635, a transmission line 623, and/or a signal line 629.

In addition, in the illustrated embodiment, the third RFIC 226 may be electrically connected to the network layer 613, for example, through first and second connecting portions (solder bumps) 640-1 and 640-2. In other embodiments, various connecting structures (e.g., solder or ball grid array (BGA)) may be used instead of the connecting portions. The third RFIC 226 may be electrically connected to the antenna element 536 via a first connecting portion 640-1, the transmission line 623, and the feeding unit 625. The third RFIC 226 may also be electrically connected to the ground layer 633 via the second connecting portion 640-2 and the conductive via 635. Although not illustrated, the third RFIC 226 may also be electrically connected to the module interface mentioned above via the signal line 629.

An electronic device may transmit an uplink signal based on resources allocated from a base station. For example, the electronic device may transmit the uplink signal with a transmit power indicated by control information received from the base station. The electronic device may set or change the transmit power for the uplink signal by controlling a power amplifier (PA) connected to an antenna of the electronic device.

Meanwhile, as described above, the NR standard further supports subcarrier spacing (SCS) exceeding 15 kilohertz (kHz)(e.g., SCS of 30 kHz, SCS of 60 kHz, SCS of 120 kHz, and SCS of 240 kHz) unlike the LTE standard. A slot used to transmit the uplink signal based on each of the SCSs is shorter than a slot used to transmit the uplink signal based on the SCS of 15 kHz. Accordingly, when transmitting the uplink signal based on each of the SCSs, a method for setting the transmit power may be required within a duration shorter than a duration for setting the transmit power when transmitting the uplink signal based on the SCS of 15 kHz.

Figure 7:
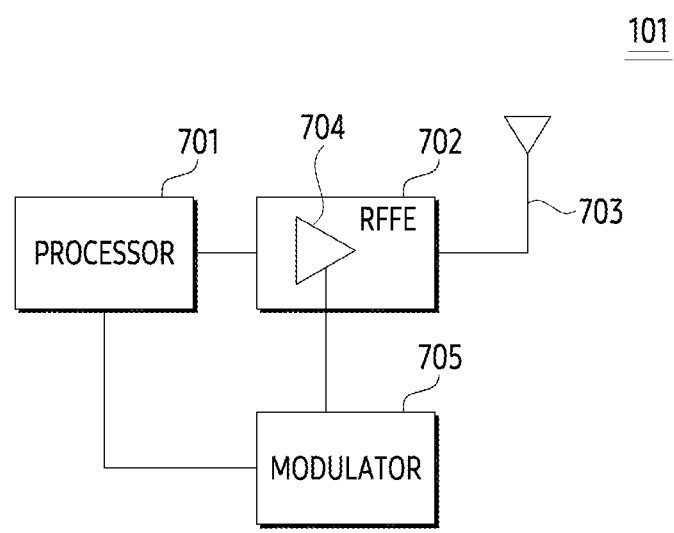
FIG. 7 is a block diagram illustrating a simplified block diagram of an electronic device according to an example embodiment.

FIG. 7 is a block diagram illustrating a simplified block diagram of an electronic device according to an embodiment. Such a block diagram may indicate functional configurations of the electronic device 101 illustrated in FIG. 1.

Figure 8:
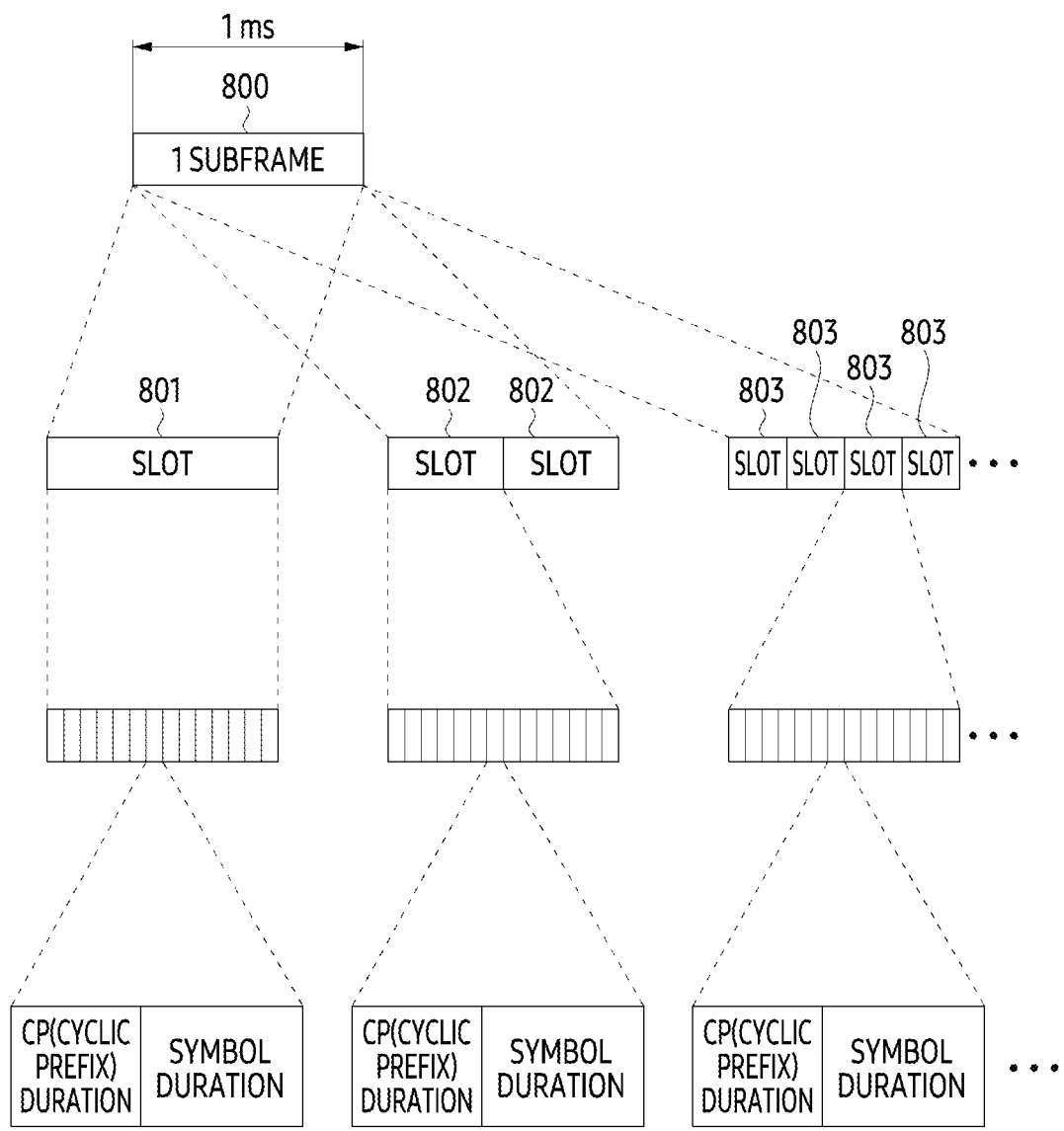
FIG. 8 illustrates slots having different lengths according to a size of a subcarrier spacing (SCS).

FIG. 8 illustrates slots having different lengths according to a size of a subcarrier spacing (SCS).

Figure 9A:
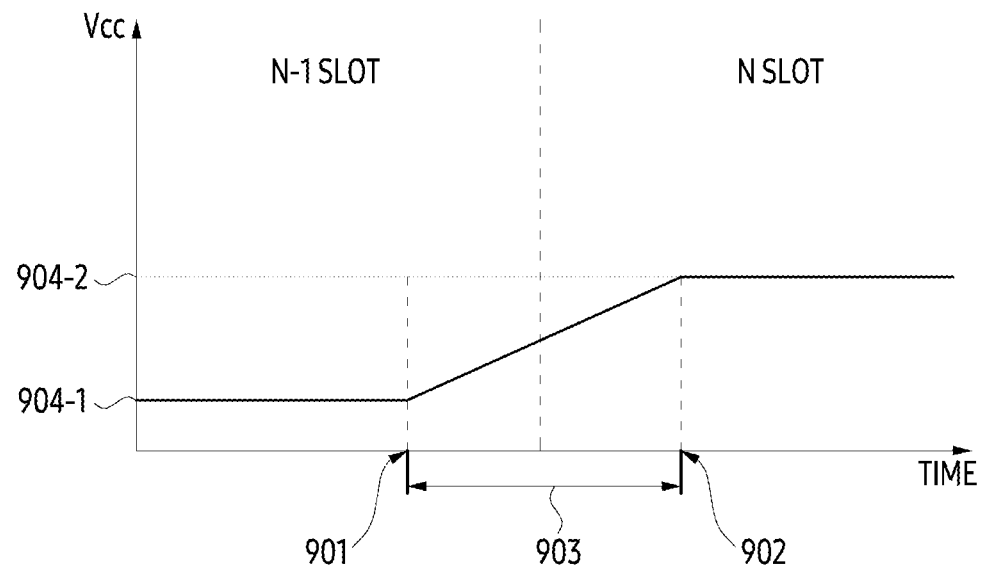
FIG. 9A illustrates an example of switching a supply voltage of a PA for user data transmitted in a slot in which uplink transmission is initiated, according to an example embodiment.
Figure 9A:
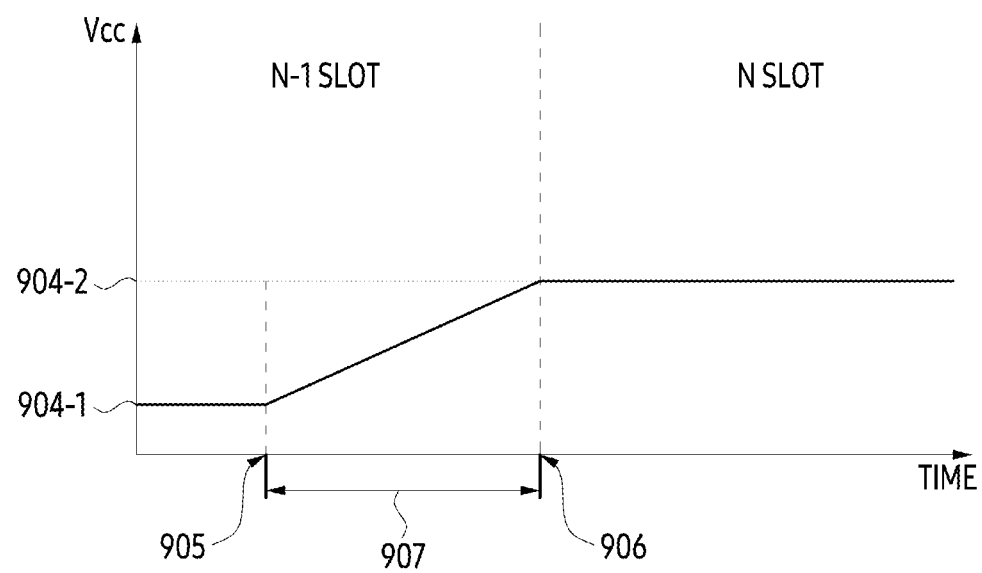

FIG. 9A illustrates an example of switching a supply voltage of a PA for user data transmitted in a slot in which uplink transmission is initiated, according to an embodiment.

Figure 9B:
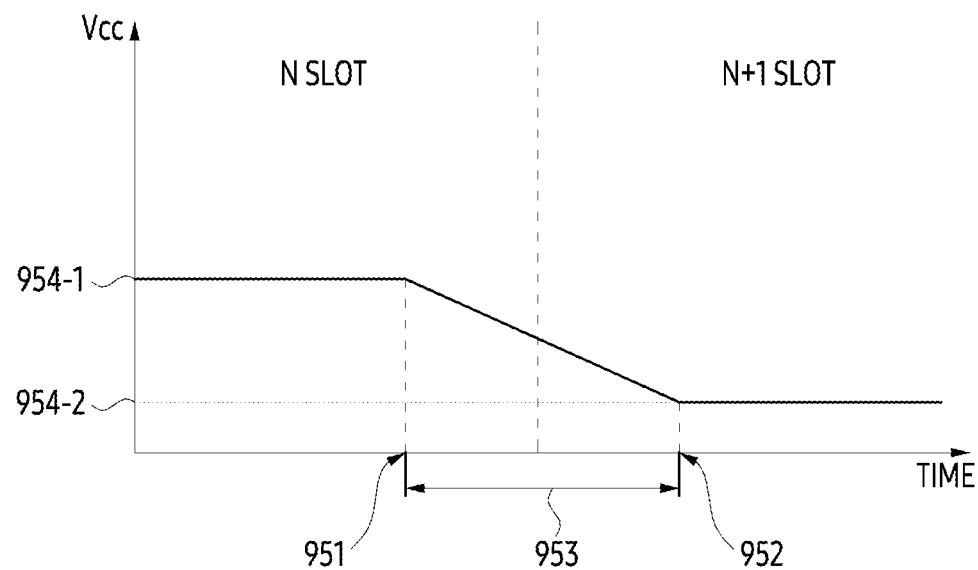
FIG. 9B illustrates an example of switching a supply voltage of a PA for user data transmitted in a slot in which uplink transmission is terminated, according to an example embodiment.
Figure 9B:
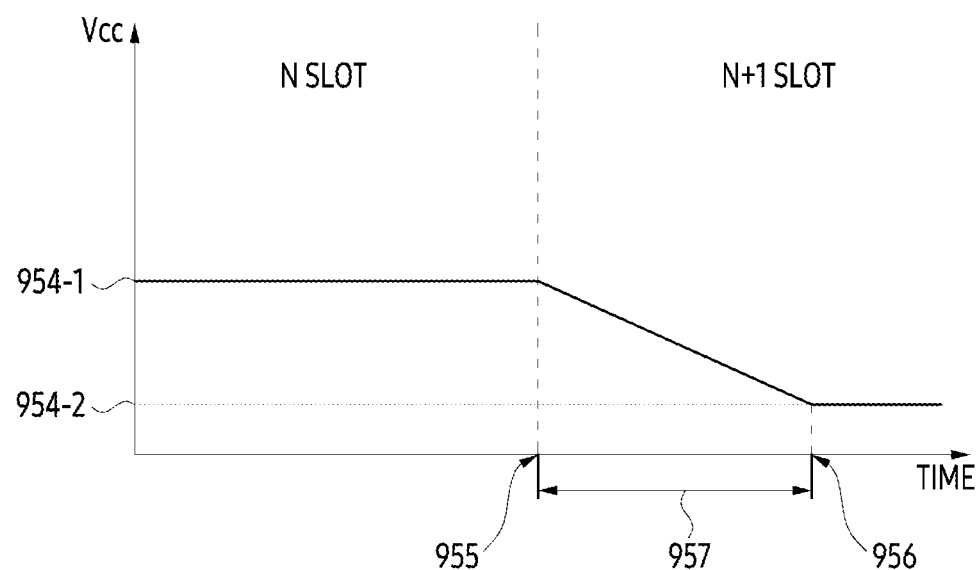

FIG. 9B illustrates an example of switching a supply voltage of a PA for user data transmitted in a slot in which uplink transmission is terminated, according to an embodiment.

Figure 10A:
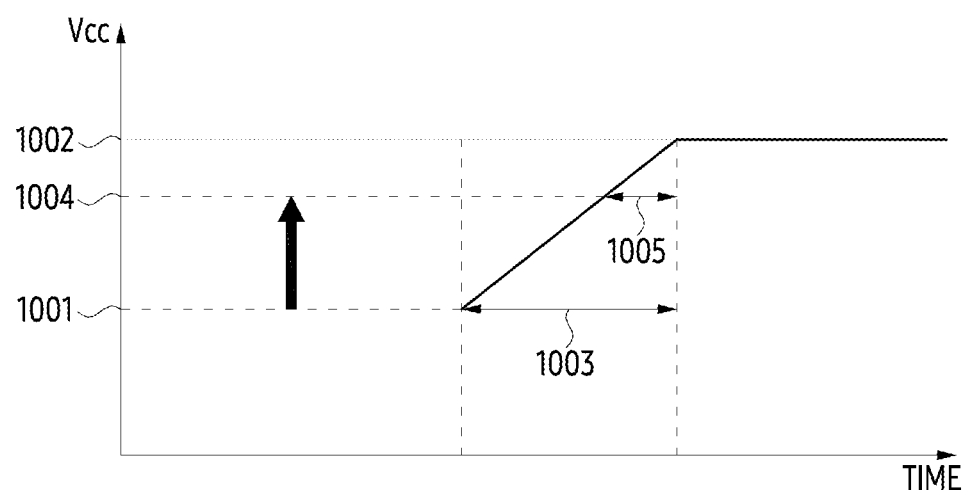
FIG. 10A illustrates an example of a predetermined voltage value for a supply voltage for a dynamic range of a PA in an electronic device according to an example embodiment.

FIG. 10A illustrates an example of a predetermined voltage value for a supply voltage for a dynamic range of a PA in an electronic device according to an embodiment.

Figure 10B:
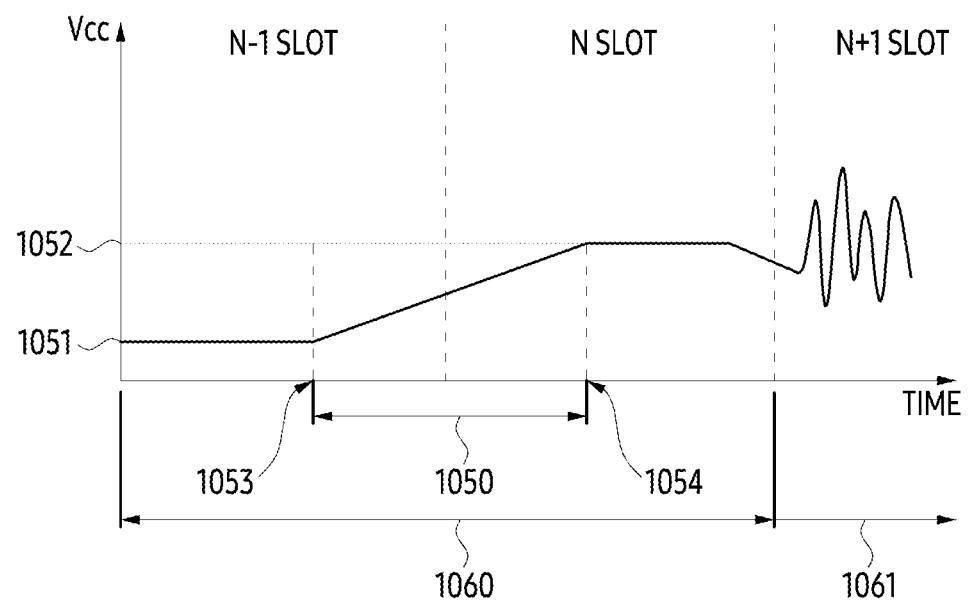
FIG. 10B illustrates an example of maintaining a supply voltage for a dynamic range of a PA equal to or greater than a predetermined voltage value according to an example embodiment.
Figure 10B:
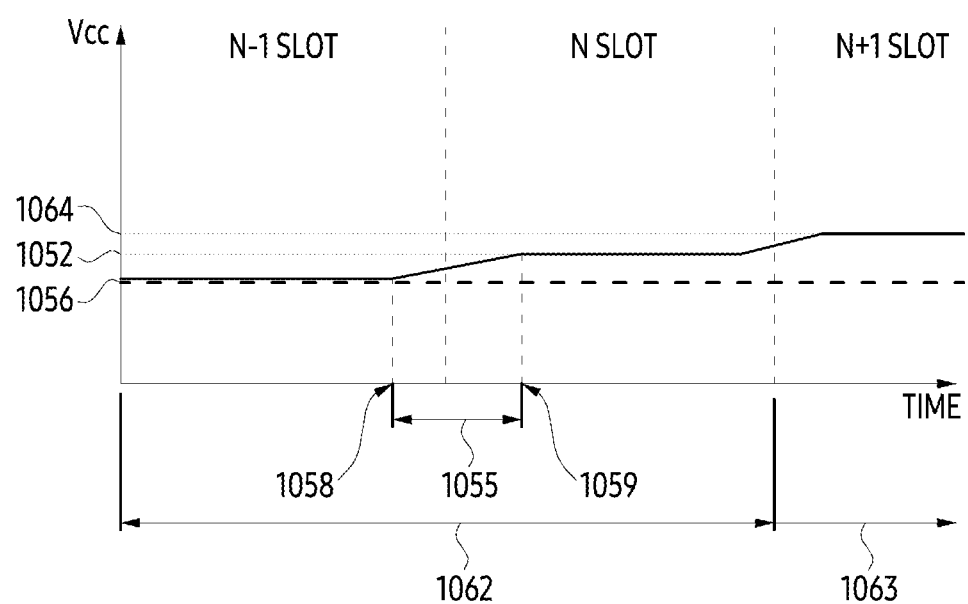

FIG. 10B illustrates an example of maintaining a supply voltage for a dynamic range of a PA equal to or greater than a predetermined voltage value according to an embodiment.

Referring to FIG. 7, an electronic device 101 may include at least one processor 701, a radio frequency front end (RFFE), and an antenna 703.

The processor 701 in the electronic device 101 may include at least a part of a processor 120 illustrated in FIG. 1.

For example, the processor 701 may include at least one of a main processor 121 or an auxiliary processor 123 which is the communication processor illustrated in FIG. 1.

The RFFE 702 in the electronic device 101 may include components for processing a signal transmitted through the antenna 703 or a signal received through the antenna 703. For example, the RFFE 702 may include at least one filter, at least one power amplifier (PA), switch, or duplexer to process the signal transmitted through the antenna 703 or the signal received through the antenna 703. The at least one PA may include a PA 704 for amplifying a transmit power of the signal transmitted through the antenna 703. In an embodiment, a supply voltage for a dynamic range of the PA 704 may be set by the processor 701. According to embodiments, the supply voltage may be disposed between the processor 701 and the RFFE 702 and may be set by a radio frequency integrated circuit (RFIC) (not illustrated in FIG. 7) in the electronic device 101 connected to each of the processor 701 and the RFFE 702. For example, the RFIC may set the supply voltage through a modulator 705 for setting the supply voltage based on envelope tracking (ET). However, it is not limited thereto. Meanwhile, RFFE 702 may be referred to as an RF (radio frequency) chain or an RF path.

The antenna 703 may include at least a portion of the antenna module 197 illustrated in FIG. 1. For example, the antenna 703 may include at least one array antenna each including a plurality of antennas, as described in the antenna module 197 illustrated in FIG. 1.

The modulator (e.g., 705) may variably supply the supply voltage to the PA (e.g., 704) based on a control of the processor (e.g., 701) and/or the RFIC. For example, the modulator 705 may be used to set the supply voltage based on the ET. According to embodiments, the modulator 705 may be used to set the supply voltage based on average power tracking (APT). According to embodiments, the modulator 705 may be referred to as an ET modulator, a supply modulator, or a power supply.

Although not illustrated in FIG. 7, according to embodiments, the electronic device 101 may further include a memory (e.g., a memory 130 illustrated in FIG. 1).

According to an embodiment, the processor 701 may identify a slot in which user data is to be transmitted to the base station and transmit power of the user data based on control information received from the base station.

For example, the user data may be at least a portion of an uplink signal transmitted through a physical uplink shared channel (PUSCH).

The slot in which the user data is to be transmitted to the base station may be indicated by at least one parameter (or field) included in a downlink control indicator (DCI) format in the control information. For example, the slot in which the user data is to be transmitted to the base station may be indicated by 'DCI format 0_0' or 'DCI format 0_1'. However, it is not limited thereto.

The length of the slot may vary according to the size of subcarrier spacing (SCS). For example, referring to FIG. 8, since the length of one subframe 800 is 1 ms (milli second) which is a fixed length, and the number of at least one slot included in one subframe 800 varies according to the size of the SCS, the length of one slot may vary according to the size of the SCS. For example, when a size of SCS is 15 kHz, since the subframe 800 includes one slot 801, the length of the slot 801 may be 1 (ms). For example, when the size of the SCS is 30 kHz, since the subframe 800 includes two slots 802, the length of the slot 802 may be 0.5 (ms). For example, when the size of the SCS is 60 kHz, since the subframe 800 includes four slots 803, the length of the slot 803 may be 0.25 (ms). Although not shown in FIG. 8, when the size of the SCS is 120 kHz, since the subframe 800 includes eight slots, the length of each of the eight slots may be 0.125 (ms) and when the size of the SCS is 240 kHz, since the subframe 800 includes sixteen slots, the length of each of the sixteen slots may be 0.0625 (ms).

According to an embodiment, one slot may include fourteen symbols that are a fixed number. For example, each of a slot 801 when the size of the SCS is 15 kHz, a slot 802 when the size of the SCS is 30 kHz, and a slot 803 when the size of the SCS is 60 kHz may include fourteen symbols. Although not shown in FIG. 8, each of a slot when a size of the SCS is 120 kHz and a slot when a size of the SCS is 240 kHz may also include fourteen symbols.

According to an embodiment, the length of the duration of the cyclic prefix (CP) included in each of the fourteen symbols included in one slot may vary according to the size of the SCS. For example, the length of one symbol for each SCS, the length of the CP duration, and the length of the symbol including the CP duration may be expressed as shown in Table 1 below.

TABLE

| Parameter | SCS | | | | |
|---|---|---|---|---|---|
| | 15 (kHz) | 30 (kHz) | 60 (kHz) | 120 (kHz) | 240 (kHz) |
| Symbol duration (µs) | 66.67 | 33.33 | 16.67 | 8.33 | 4.17 |
| CP duration (µs) | 4.69 | 2.34 | 1.17 | 0.57 | 0.29 |
| Symbol including CP (µs) | 71.35 | 35.68 | 17.84 | 8.92 | 4.46 |

Hereinafter, a SCS of 15 kHz may be referred to as a first SCS, and each of the SCSs exceeding 15 kHz may be referred to as a second SCS.

According to an embodiment, the transmit power may be indicated by a transmit power control (TPC) command, which is one of parameters included in a downlink control indicator (DCI) format in the control information. For example, the transmit power may be indicated by a TPC command included in 'DCI format 0_0' or 'DCI format 0_1. For example, the transmit power indicated by the TPC command in 'DCI format 0_0' or 'DCI format 0_1' may be identified as the transmit power of user data to be transmitted within a slot allocated through 'DCI format 0_0' or 'DCI format 0_1'. For another example, the transmit power may be indicated by a TPC command included in 'DCI format 2_2'. However, it is not limited thereto.

According to an embodiment, the processor 701 may control the power amplifier (PA) 704 to set the transmit power of the user data to be transmitted within the identified slot. For example, the processor 701 may control a supply voltage (e.g., Vcc) for a dynamic range of the PA 704 to set or change the transmit power. For example, the dynamic range may refer to a range in which a relationship between an input voltage of PA 704 and an output voltage of PA 704 has linearity. For example, the processor 701 may control the supply voltage by different methods according to whether the identified slot is a slot for initiating uplink transmission, whether the identified slot is a slot for terminating uplink transmission, and a size of the SCS.

For example, when the identified slot is a slot for initiating uplink transmission, a duration for switching the supply voltage may vary according to the size of the SCS.

For example, a duration of switching the supply voltage when the user data is transmitted within a slot for initiating uplink transmission based on the first SCS may be different from a duration of switching the supply when the user data is transmitted within a slot for initiating uplink transmission based on the second SCS. For example, referring to FIG. 9A, the processor 701 may switch the supply voltage from a voltage value 904-1 corresponding to a state prior to initiating uplink transmission to a voltage value 904-2 corresponding to the identified transmit power, based on identifying that the user data is transmitted within Nth slot (N is any natural number) in which uplink transmission is initiated based on the first SCS, within a duration 903 from timing 901 in the N−1th slot to timing 902 in the Nth slot. For example, the processor 701 may switch the supply voltage to the voltage value 904-2 to maintain communication quality (e.g., error vector magnitude (EVM)) during switching the supply voltage, within the duration 903 from the timing 901 in the duration in which uplink control information such as a demodulation reference signal (DMRS) and/or channel quality indicator (CQI) is transmitted in the N−1th slot to the timing 902 in the CP duration of the first symbol in the Nth slot. For another example, based on identifying that the user data is transmitted within the Nth slot initiating uplink transmission based on the second SCS, the processor 701 may switch the supply voltage from the voltage value 904-1 to the voltage value 904-2 within the duration 907 from timing 905 in the N−1th slot to timing 906 in the N−1th slot. The duration 907 may have a length corresponding to the duration 903, but the duration 907 may be included in the N−1th slot unlike the duration 903. For example, since a length of a CP duration of a first symbol in an Nth slot in the second SCS is shorter than a length of a CP duration of a first symbol in the Nth slot in the first SCS as shown in Table 1 and the N−1th slot is not used for transmission of user data, the processor 701 may complete the switching of the supply voltage at a timing 906 before the Nth slot is initiated.

According to embodiments, unlike the illustration of FIG. 9A, based on identifying that the user data is transmitted within the Nth slot initiating uplink transmission based on the first SCS, the processor 701 may switch the supply voltage from the voltage value 904-1 to the voltage value 904-2 within the duration 907 from the timing 905 in the N−1 slot to the timing 906 in the Nth slot.

Referring back to FIG. 7, when the identified slot is a slot that terminates uplink transmission, a duration for switching the supply voltage may be different according to a size of the SCS.

For example, a duration for switching the supply voltage when the user data is transmitted in a slot for terminating uplink transmission based on the first SCS may be different from a duration for switching the supply voltage when the user data is transmitted in a slot for terminating uplink transmission based on the second SCS. For example, referring to FIG. 9B, based on identifying that the user data is transmitted within an Nth slot (N is any natural number) terminating uplink transmission based on the first SCS, the processor 701 may switch the supply voltage from a voltage value 954-1 corresponding to the identified transmit power to the voltage value 954-2 corresponding to a state after terminating uplink transmission within the duration 953 from the timing 951 in the Nth slot to the timing 952 in the N+1th slot. For example, the processor 701 may switch the supply voltage from the voltage value 954-1 to the voltage value 954-2 to maintain communication quality while switching the supply voltage within the duration 953 from the timing 951 in the duration in which uplink control information such as DMRS and/or CQI is transmitted in the Nth slot to the timing 952 in the N+1th slot. For another example, based on identifying that the user data is transmitted within the Nth slot terminating uplink transmission based on the second SCS, the processor 701 may switch the supply voltage from the voltage value 954-1 to the voltage value 954-2 within the duration 957 from the timing 955 in the N+1 slot to the timing 956 in the N+1 slot. The duration 957 may have a length corresponding to the duration 953, but the duration 957 may be included in the N+1 slot unlike the duration 953. For example, since the N+1 slot is not used for transmitting user data, the processor 701 may initiate switching the supply voltage at the timing 955 after the Nth slot is terminated.

According to embodiments, unlike the illustration of FIG. 9B, based on identifying that the user data is transmitted within the Nth slot terminating uplink transmission based on the first SCS, the processor 701 may switch the supply voltage from the voltage value 954-1 to the voltage value 954-2 within the duration 957 from the timing 955 in the N+1 slot.

Referring back to FIG. 7, when the identified slot is not a slot for initiating uplink transmission and a slot for terminating uplink transmission, the minimum voltage value of the supply voltage within at least one slot rightly before the identified slot may be different according to the size of the SCS. The term "rightly" before as used herein may indicate immediately before.

For example, the minimum voltage value of the supply voltage, when at least one slot rightly before the identified slot is a slot for uplink transmission and the user data is transmitted based on the second SCS, in the at least one slot may be higher than the minimum voltage value of the supply voltage, when the at least one slot is a slot for uplink transmission and the user data is transmitted based on the first SCS, in the at least one slot. For example, since the length of the CP duration of the first symbol in the slot in the second SCS is shorter than the length of the CP duration of the first symbol in the slot in the first SCS, reducing the time required to switch a supply voltage when transmitting the user data based on the second SCS to a voltage value corresponding to the identified transmit power may be required for maintaining communication quality in the second SCS. When the user data is transmitted based on the second SCS, the processor 701 may maintain the supply voltage in the at least one slot rightly before the identified slot above a predetermined voltage value to reduce the time. For example, referring to FIG. 10A, the length of the duration 1003, for switching the supply voltage from a voltage value 1001 corresponding to transmit power in the at least one slot to a voltage value 1002 corresponding to the identified transmit power, may cause a deterioration of communication quality due to the length of the CP duration of the first symbol in the slot in the second SCS. The processor 701 may maintain the supply voltage within the at least one slot above a predetermined voltage value 1004 that is higher than the voltage value 1001 to reduce the length of the duration of switching the supply voltage to the voltage value 1002. For example, the processor 701 may reduce the length of the duration 1005 for switching the supply voltage to the voltage value 1002 by maintaining the supply voltage in the at least one slot above the predetermined voltage value 1004 and switching the supply voltage from the predetermined voltage value 1004 for transmitting the user data in the identified slot to the voltage value 1002.

Referring back to FIG. 7, the predetermined voltage value may vary according to the size of the second SCS. For example, since a length of the CP duration of the first symbol in the slot when a size of the second SCS is 60 kHz is shorter than a length of the CP duration of the first symbol in the slot when a size of the second SCS is 30 kHz, the predetermined voltage value when the size of the second SCS is 60 kHz may be higher than the predetermined voltage value when the size of the second SCS is 30 kHz.

Meanwhile, when the identified slot is not a slot for initiating uplink transmission and a slot for terminating uplink transmission, a timing to initiate switching the supply voltage to a voltage value corresponding to the identified transmit power and a timing to terminate switching the supply voltage to the voltage value corresponding to the identified transmit power may vary according to a size of the SCS. For example, referring to FIG. 10B, based on identifying that the user data is transmitted based on the first SCS, the processor 701 may switch the supply voltage from a voltage value 1051 corresponding to transmit power in at least one slot rightly before the slot to a voltage value 1052 corresponding to the identified transmit power, within the duration 1050. The voltage value 1051 may be equal to or greater than the voltage value of the supply voltage corresponding to the minimum transmit power of the electronic device 101 in the first SCS. The start timing 1053 of the duration 1050 may be set, based on the voltage value of the supply voltage corresponding to the minimum transmit power of the electronic device 101 in the first SCS, a duration in which uplink control information such as DMRS and/or CQI is transmitted in the N−1 slot, and a CP duration of the first symbol in the Nth slot in the first SCS. The end timing 1054 of the duration 1050 may be set based on the voltage value of the supply voltage corresponding to the minimum transmit power of the electronic device 101 in the first SCS, a duration in which the uplink control information is transmitted in the N−1 slot, and a CP duration of the first symbol in the Nth slot in the first SCS. For example, the start timing 1053 of the duration 1050 may be in a duration in which the control information is transmitted in the N−1 slot, and the end timing 1054 of the duration 1050 may be in a CP duration of the first symbol in the Nth slot.

As another example, based on identifying that the user data is transmitted based on the second SCS, the processor 701 may switch the supply voltage from the predetermined voltage value 1056 to a voltage value 1052 corresponding to the identified transmit power within the duration 1055. Although not shown in FIG. 10B, since the voltage value at the start timing 1058 of the duration 1055 is the predetermined voltage value 1056, which is higher than the voltage value 1051 at the start timing 1053 of the duration 1050, the duration 1055 may be shorter than the duration 1050. Meanwhile, the start timing 1058 of the duration 1055 may be set based on the predetermined voltage value 1056, the duration in which uplink control information such as DMRS and/or CQI is transmitted, and the CP duration of the first symbol in the slot in the first SCS. The end timing 1059 of the duration 1055 may be set based on the predetermined voltage value 1056, the duration in which the control information is transmitted, and the CP duration of the first symbol in the slot in the first SCS. For example, the start timing 1058 of the duration 1055 may be in a duration in which the control information is transmitted in the N−1 slot, and the end timing 1059 of the duration 1055 may be in a CP duration of a first symbol in the Nth slot.

In an embodiment, when the user data is transmitted based on the first SCS, the processor 701 may control transmit power of the uplink signal transmitted in the N+1 slot by setting the supply voltage using a signal obtained based on envelope tracking (ET) within the duration 1061, unlike a duration 1060 that controls the transmit power of an uplink signal by setting the supply voltage based on average power tracking (APT). For example, the processor 701 may control the RFIC to set the supply voltage through the modulator 705 using the signal obtained based on the ET, within the duration 1061, to enhance the efficiency of the PA 704 in terms of voltage supply.

In an embodiment, when the user data is transmitted based on the second SCS, the processor 701 may maintain the supply voltage above the predetermined voltage value, within the duration 1063 based on the APT, as same as the duration 1062 of maintaining the supply voltage above the predetermined voltage value based on the APT. For example, the processor 701 may bypass or refrain from setting the supply voltage through the modulator 705 using a signal obtained based on the ET and maintain the supply voltage above the predetermined voltage value based on the APT, as the control of the transmit power within a duration 1061, to reduce the time required to switch the supply voltage from the voltage value 1052 to a voltage value 1064 corresponding to the transmit power of user data in the N+1 slot.

Referring back to FIG. 7, in an embodiment, the processor 701 may maintain the supply voltage in the at least one slot rightly before the identified slot above the predetermined voltage value by comparing each of a plurality of candidate supply voltage values in reference data with the predetermined voltage value when the user data is transmitted based on the second SCS. Each of the plurality of candidate supply voltage values may be a voltage value for minimizing power consumption by the PA 704 operating within the dynamic range. Each of the plurality of candidate voltage values may relate to transmit power of an uplink signal within the reference data. For example, the reference data may be a table for average power tracking (APT), and be expressed as shown in Table 2 below.

TABLE 2

| Transmit (Tx) power (dBm) | Candidate supply voltage value (V) |
|---|---|
| 18 | A1 |
| 17 | A2 |
| 16 | A3 |
| 15 | A4 |
| 14 | A5 |
| . . . | . . . |

For example, in Table 2, when the transmit power of the uplink signal is 18 (decibel-milliwatts (dBm)), the supply voltage for the current optimization of the PA 704 may be A1 and when the transmit power of the uplink signal is 15 (dBm), the supply voltage for the current optimization of the PA 704 may be A4.

For example, when the user data is transmitted based on the second SCS, the processor 701 may identify the candidate supply voltage value corresponding to the transmit power in the at least one slot rightly before the identified slot among the plurality of candidate supply voltage values in the reference data, and maintain the supply voltage above the predetermined voltage value, within the at least one slot, by setting the supply voltage in the at least one slot to the predetermined voltage value on a condition that the candidate supply voltage value is less than the predetermined voltage value and setting the supply voltage in the at least one slot to the candidate supply voltage value on a condition that the candidate supply voltage value is equal to or greater than the predetermined voltage value.

In an embodiment, when the supply voltage in the at least one slot is set to the predetermined voltage value higher than the candidate voltage value corresponding to the transmit power in the at least one slot, the processor 701 may monitor a transmission signal through a feedback receive path operatively coupled to a coupler connected to the antenna 703, and may execute compensation on transmit power provided from the PA 704 based on the monitoring result, for stability of the transmit power within the at least one slot.

In an embodiment, the processor 701 may change the supply voltage from the predetermined voltage value to the candidate supply voltage value lower than the predetermined voltage value and corresponding to the transmit power, based on identifying that transmit power is maintained within a predetermined number of consecutive slots after the identified slot. For example, the processor 701 may change or switch the supply voltage to the candidate supply voltage value to reduce power consumption (or current consumption) by the PA 704, based on identifying that the transmit power is maintained within the predetermined number of consecutive slots after the identified slot.

In an embodiment, the reference data may be formed or configured by each SCS. For example, the electronic device 101 may store a first reference data for the first SCS including the first candidate supply voltage values for minimizing power consumption by the PA 704 operating within the dynamic range and the second reference data for the second SCS including the second candidate supply voltage values for reducing power consumption by the PA 704 operating within the dynamic range. For example, the second reference data may be set based on a range (e.g., a maximum of 4 (decibel (dB)) of transmit power of user data that may be changed by the base station and the predetermined voltage value. When the user data is transmitted based on the second SCS, the processor 701 may set the supply voltage in the at least one slot rightly before the identified slot to the candidate supply voltage value corresponding to the transmit power in the at least one slot among the second candidate supply voltage values. For example, since the second reference data is set based on a range of transmit power (e.g., a maximum of 4 (dB)) of user data that may be changed by the base station and the predetermined voltage value, the set candidate supply voltage value may be greater than or equal to the predetermined voltage value. In an embodiment, when the user data is transmitted based on the first SCS, the processor 701 may set the supply voltage in the at least one slot to a candidate supply voltage value corresponding to the transmit power in the at least one slot among the first candidate supply voltage values. In an embodiment, a calibration may be performed for each SCS when the electronic device 101 is manufactured for the first reference data and the second reference data.

For example, the first reference data and the second reference data may be expressed as shown in Table 3.

TABLE 3

| First reference data for first SCS | | Second reference data for second SCS | |
|---|---|---|---|
| Transmit (Tx) power (dBm) | Candidate supply voltage value (V) | Transmit (Tx) power (dBm) | Candidate supply voltage value (V) |
| 18 | A1 | 18 | B1 |
| 17 | A2 | 17 | B2 |
| 16 | A3 | 16 | B3 |
| ... | ... | ... | ... |

In Table 3, B1 may be higher than A1, B2 may be higher than A2, and B3 may be higher than A3. For example, when the transmit power of the uplink signal transmitted based on the second SCS is the same as the transmit power of the uplink signal transmitted based on the first SCS, a candidate supply voltage value in the second reference data corresponding to the transmit power may be higher than a candidate supply voltage value in the first reference data corresponding to the transmit power. However, it is not limited thereto.

As described above, when the user data is transmitted based on the second SCS greater than the first SCS, the electronic device 101 may prevent or reduce a decrease in communication performance (e.g., an increase in error vector magnitude (EVM)) due to a change in transmit power of the user data by changing the duration for switching the supply voltage of the PA 704. For example, when the user data is transmitted within the slot in which uplink transmission is initiated based on the second SCS, the electronic device 101 may prevent or reduce a decrease in communication performance due to a change in transmit power of the user data by performing the switching within a duration within the slot rightly before the slot. For example, when the user data is transmitted within the slot in which uplink transmission is terminated based on the second SCS, the electronic device 101 may prevent or reduce a decrease in communication performance due to a change in transmit power of the user data by performing the switching within a duration of the slot rightly after the slot.

As described above, when the user data is transmitted based on the second SCS greater than the first SCS, the electronic device 101 may prevent or reduce a decrease in communication performance due to a change in transmit power of the user data by maintaining the supply voltage of PA 704 above the predetermined voltage value. For example, when the user data is transmitted based on the second SCS, the electronic device 101 may maintain the supply voltage in at least one slot rightly before the slot in which the user data is to be transmitted to be equal to or greater than the predetermined voltage value, to reduce the time for switching the supply voltage to the voltage value corresponding to the transmit power of the user data. The electronic device 101 may prevent or reduce a decrease in communication performance due to a change in the transmit power of the user data by maintaining the supply voltage above the predetermined voltage value.

Figure 11:
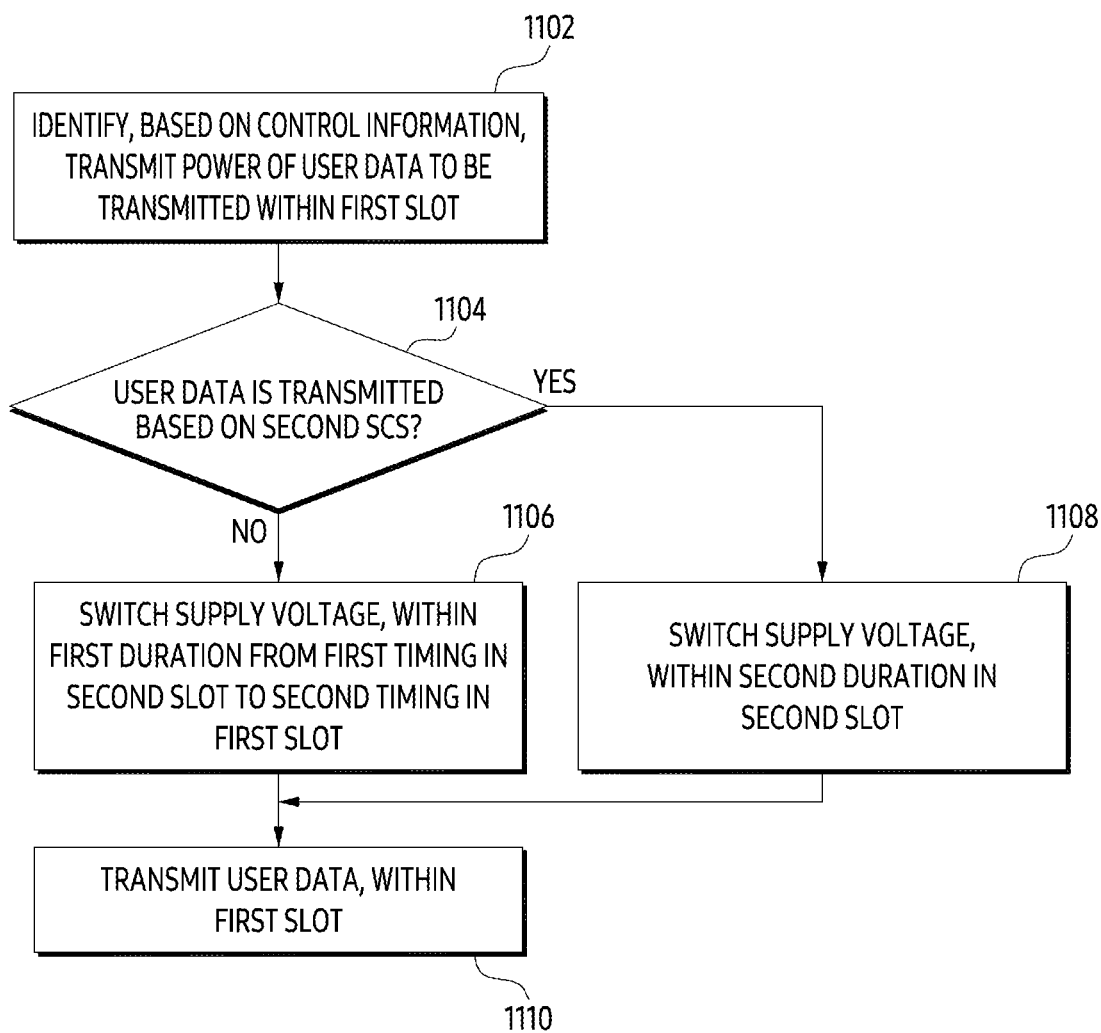
FIG. 11 is a flowchart illustrating an example method of switching a supply voltage of a power amplifier (PA) when user data is transmitted within a slot in which uplink transmission is initiated.

FIG. 11 is a flowchart illustrating a method of switching a supply voltage of a power amplifier (PA) when user data is transmitted within a slot in which uplink transmission is initiated. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 11, in operation 1102, the processor 701 may identify transmit power of user data to be transmitted in a first slot where uplink transmission is initiated based on control information received from a base station. For example, based on the scheduling information in 'DCI format 0_0' or 'DCI format 0_1' in the control information, the processor 701 may identify that transmission of the user data is initiated in the first slot where uplink transmission is initiated, and may identify the transmit power based on a TPC command in 'DCI format 0_0' or 'DCI format 0_1' in the control information. For another example, based on the TPC command in 'DCI format 2_2' in the control information, the processor 701 may identify the first slot in which uplink transmission is initiated after receiving the control information as a slot for transmitting the user data, and may identify the transmit power based on the TPC command. However, it is not limited thereto.

In operation 1104, the processor 701 may identify whether the user data is transmitted based on the second SCS. For example, the processor 701 may identify whether the user data is transmitted based on the first SCS or the user data is transmitted based on the second SCS. On a condition that the user data is transmitted based on the second SCS, the processor 701 may execute operation 1108 and on a condition that the user data is transmitted based on the first SCS, the processor 701 may execute operation 1106.

FIG. 11 illustrates an example of executing operation 1104 after executing operation 1102, but this is for convenience of description. The processor 701 may execute operation 1104 before or during execution of operation 1102. For example, operation 1104 is illustrated in FIG. 11 as an operation executed after operation 1102 to represent that the processor 701 executes operation 1106 or operation 1108 according to the size of the SCS used for transmission of the user data and not illustrated to specify an execution order of the processor 701. For example, the processor 701 may identify whether the SCS used for transmitting the user data is the first SCS or the second SCS through a radio resource control (RC), identify whether the SCS used for transmitting the user data is the first SCS or the second SCS through a downlink (DCI) and identify whether the SCS used for transmitting the user data is the first SCS or the second SCS through a fallback caused by no transmission or reception for a certain period of time.

In operation 1106, based on identifying that the user data is transmitted based on the first SCS, the processor 701 may switch the supply voltage for the dynamic range of the PA 704 to a voltage value corresponding to the transmit power identified in operation 1102, within a first duration (e.g., duration 903) from a first timing in a second slot rightly before the first slot to a second timing in the first slot. For example, the first timing may be in at least one symbol in the second slot transmitting uplink control information such as DMRS or CQI, and the second timing may be in a CP duration of the first symbol in the first slot, to reduce or prevent a decrease in communication quality due to the switching of the supply voltage. However, it is not limited thereto.

In operation 1108, based on identifying that the user data is transmitted based on the second SCS, the processor 701 may switch the supply voltage to the voltage value corresponding to the transmit power identified in operation 1102, within a second duration (e.g., duration 907) in the second slot before the initiation of the first slot. For example, since the first slot is a slot in which uplink transmission is initiated, the processor 701 may reduce or prevent a decrease in communication quality due to the switching of the supply voltage by switching the supply voltage to the voltage value, within the second duration in the second slot rightly before the first slot in which uplink transmission is initiated.

In operation 1110, The processor 701 may transmit the user data, with the transmit power, to the base station within the first slot, using the PA 704 operating based on the supply voltage switched to the voltage value.

Figure 12:
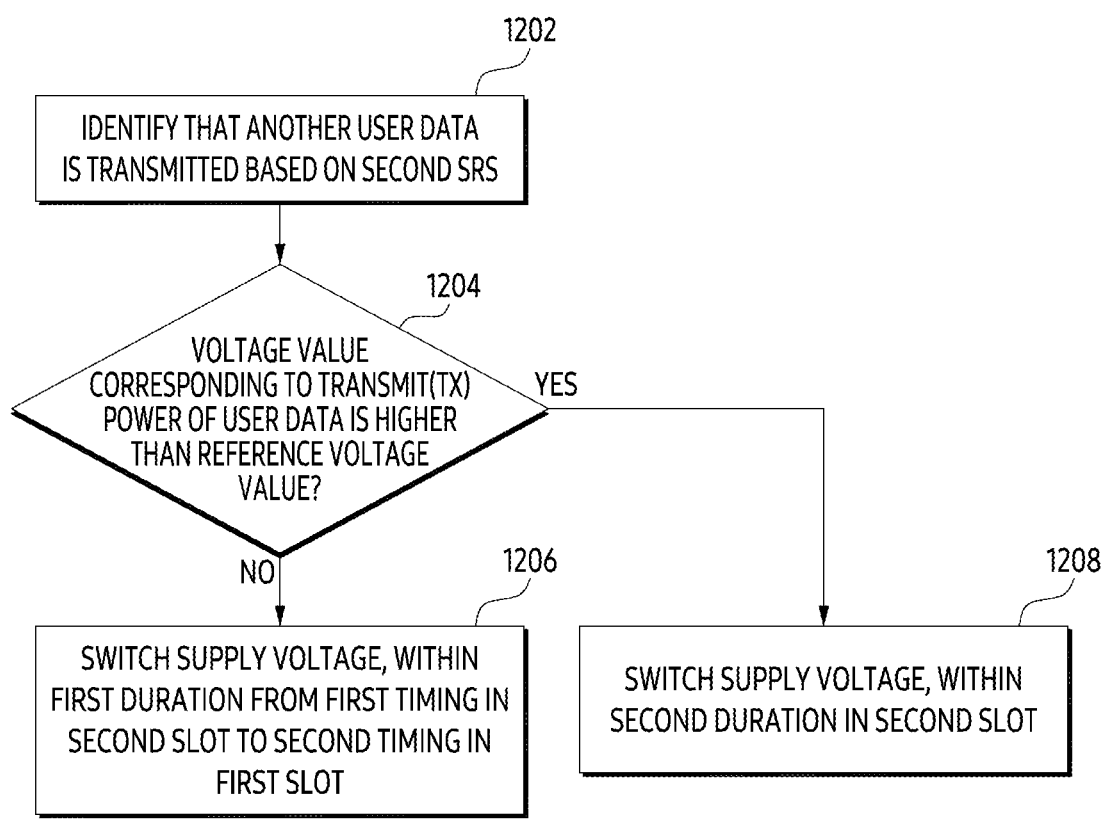
FIG. 12 is a flowchart illustrating a method of changing an operation of switching a supply voltage of a PA according to whether a voltage value corresponding to transmit power of user data is higher than a reference voltage value, according to an example embodiment.

FIG. 12 is a flowchart illustrating an example method of changing an operation of switching a supply voltage of a PA according to whether a voltage value corresponding to transmit power of user data is higher than a reference voltage value, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 12, in operation 1202, the processor 701 may identify that the user data is transmitted based on the second SCS. For example, operation 1202 may correspond to identifying that the user data is transmitted based on the second SCS in operation 1104 illustrated in FIG. 11.

In operation 1204, the processor 701 may identify whether the voltage value corresponding to the transmit power of the user data identified in operation 1102 is higher than the reference voltage value. The reference voltage value may be a parameter for comparison with the voltage value to identify whether a time required to switch the supply voltage is relatively long with respect to a length of a slot used in the second SCS. In an embodiment, the reference voltage value may vary according to the magnitude of the second SCS. For example, the reference voltage value when the size of the second SCS is 30 kHz may be lower than the reference voltage value when the size of the second SCS is 60 kHz. However, it is not limited thereto. The processor 701 may execute operation 1208 on a condition that the voltage value is higher than the reference voltage value and execute operation 1206 on a condition that the voltage value is equal to or lower than the reference voltage value.

FIG. 12 illustrates identifying whether the voltage value is higher than the reference voltage value in operation 1204, but operation 1204 may be replaced by identifying whether the transmit power is higher than the reference power. When the processor 701 identifies whether the transmit power is higher than the reference power in operation 1204, the processor 701 may execute operation 1208 on a condition that the transmit power is higher than the reference power, and execute operation 1206 otherwise.

In operation 1206, based on identifying that the voltage value is equal to or lower than the reference voltage value, the processor 701 may switch the supply voltage to the voltage value within a first duration from the first timing in the second slot rightly before the first slot to a second timing in the first slot. For example, the first timing may be within at least one symbol in the second slot transmitting uplink control information such as DMRS and/or CQI to reduce or prevent a decrease in communication quality due to the switching of the supply voltage, and the second timing may be within a CP duration of the first symbol in the first slot. However, it is not limited thereto.

In operation 1208, the processor 701 may switch the supply voltage to the voltage value within the second duration in the second slot before the initiation of the first slot based on identifying that the voltage value is higher than the reference voltage value. For example, since the first slot is a slot in which uplink transmission is initiated, the processor 701 may reduce or prevent deterioration of communication quality due to switching of the supply voltage by switching the supply voltage to the voltage value within the second duration in the second slot rightly before the first slot in which uplink transmission is initiated.

As described above, the electronic device 101 may change a duration for switching a supply voltage of the PA 704 according to a voltage value corresponding to a transmit power of user data.

Figure 13:
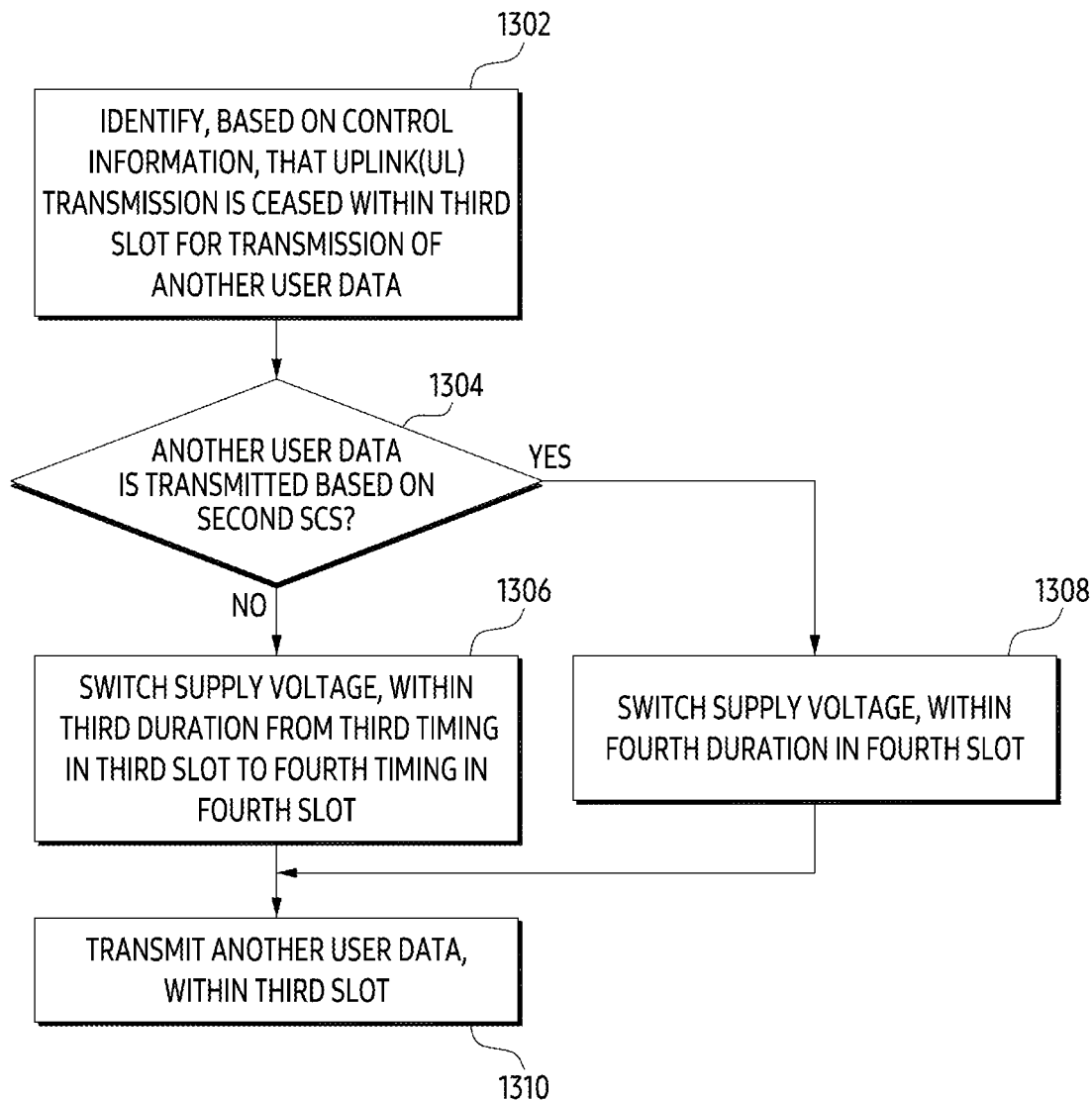
FIG. 13 is a flowchart illustrating a method of switching a supply voltage of a PA when user data is transmitted in a slot in which uplink transmission is terminated, according to an example embodiment.

FIG. 13 is a flowchart illustrating a method of switching a supply voltage of a PA when user data is transmitted in a slot in which uplink transmission is terminated, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 13, in operation 1302, the processor 701 may identify that uplink transmission is terminated in a third slot for transmitting another user data based on the control information received from the base station. For example, the processor 701 may identify that uplink transmission is terminated in the third slot to which the user data is to be transmitted based on scheduling information in 'DCI format 0_0' or 'DCI format 0_1' in the control information. However, it is not limited thereto.

In operation 1304, the processor 701 may identify whether the other user data is transmitted based on the second SCS. For example, the processor 701 may identify whether the other user data is transmitted based on the first SCS or the other user data is transmitted based on the second SCS. On a condition that the other user data is transmitted based on the second SCS, the processor 701 may execute operation 1308, and on the condition that the other user data is transmitted based on the first SCS, the processor 701 may execute operation 1306.

FIG. 13 illustrates an example of executing operation 1304 after executing operation 1302, but this is for convenience of description. The processor 701 may execute operation 1304 before or during execution of operation 1302. For example, operation 1304 is illustrated in FIG. 13 as an operation executed after operation 1302 to represent that the processor 701 executes operation 1306 or operation 1308 according to the size of the SCS used for transmission of the other user data and not illustrated to specify an execution order of the processor 701.

In operation 1306, based on identifying that the other user data is transmitted based on the first SCS, the processor 701 may switch the supply voltage within a third duration (e.g., duration 953) from the third timing in the third slot to the fourth timing in the fourth slot rightly after the third slot. For example, the processor 701 may switch the supply voltage from a voltage value corresponding to a transmit power of the other user data to another voltage value for turning off the transmit power of the electronic device 101 within the third duration from the third timing to the fourth timing. For example, the third timing may be in at least one symbol in the third slot transmitting uplink control information such as DMRS and/or CQI to reduce or prevent a decrease in communication quality due to the switching of the supply voltage. However, it is not limited thereto.

In operation 1308, based on identifying that the other user data is transmitted based on the second SCS, the processor 701 may switch the supply voltage to the other voltage value within a fourth duration (e.g., duration 957) in the fourth slot after the end of the third slot. For example, since the third slot is a slot in which uplink transmission is terminated, the processor 701 may reduce or prevent a decrease in communication quality due to the conversion of the supply voltage by switching the supply voltage within the fourth duration in the fourth slot rightly after the third slot where uplink transmission is terminated.

Meanwhile, in operation 1310, the processor 701 may transmit the other user data within the third slot.

Figure 14:
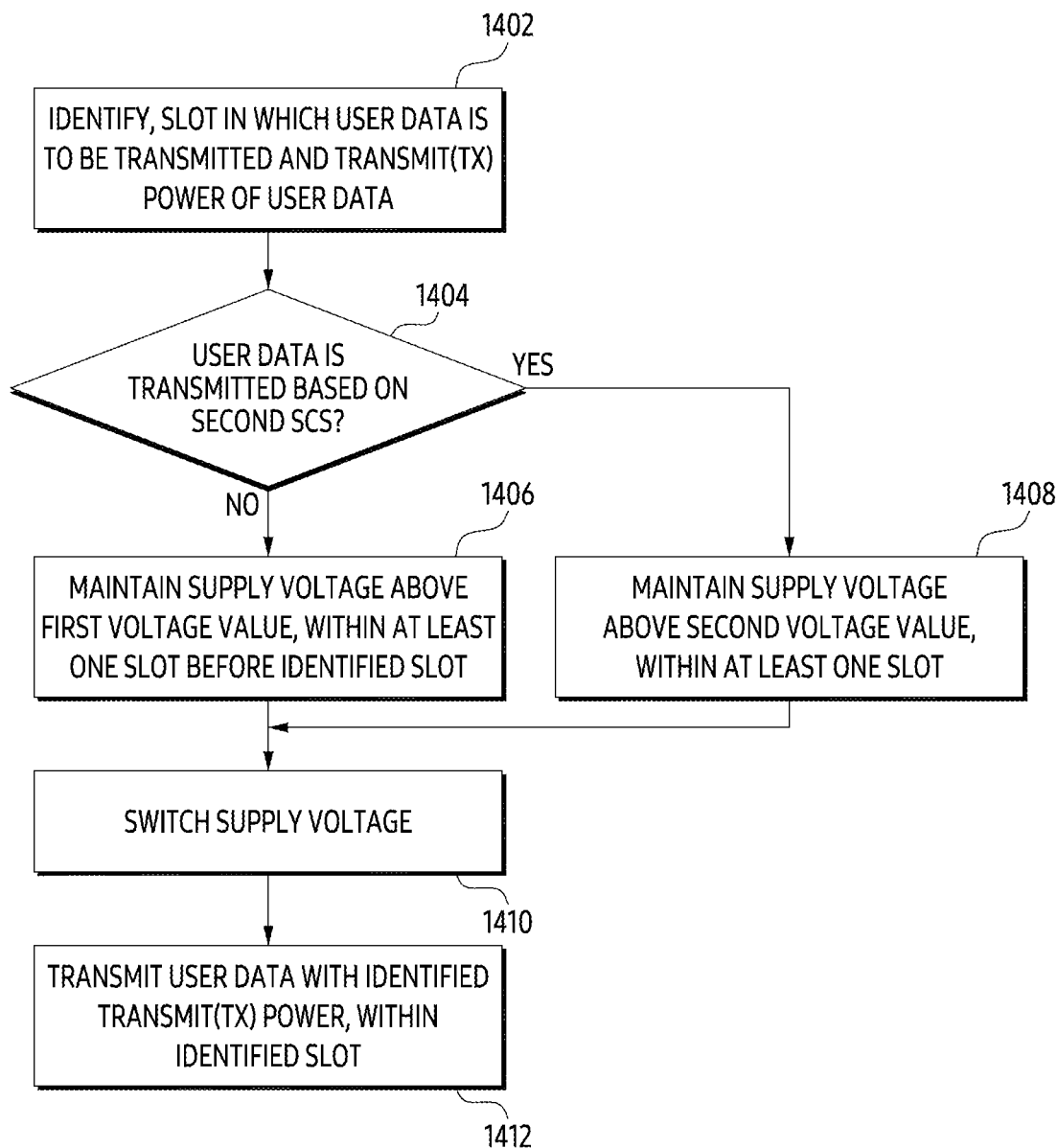
FIG. 14 is a flowchart illustrating a method of maintaining a supply voltage in at least one slot before a slot for transmitting user data, according to an example embodiment.

FIG. 14 is a flowchart illustrating a method of maintaining a supply voltage in at least one slot before a slot for transmitting user data, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 14, in operation 1402, the processor 701 may identify a slot in which user data is to be transmitted and transmit power of the user data based on the control information received from the base station. For example, the processor 701 may identify the slot to which the user data is to be transmitted based on scheduling information in 'DCI format 0_0' or 'DCI format 0_1' in the control information, and may identify the transmit power based on a TPC command in 'DCI format 0_0' or 'DCI format 0_1' in the control information. For example, the slot may not be a slot in which uplink transmission is initiated and a slot in which uplink transmission is terminated. For another example, the processor 701 may identify the slot in which uplink transmission is performed after receiving the control information based on a TPC command in 'DCI format 2_2' in the control information and identify the transmit power based on the TPC command. However, it is not limited thereto.

In operation 1404, the processor 701 may identify whether the user data is transmitted based on the second SCS. For example, the processor 701 may identify whether the user data is transmitted based on the first SCS or the user data is transmitted based on the second SCS. On a condition that the user data is transmitted based on the second SCS, the processor 701 may execute operation 1408 and on a condition that the user data is transmitted based on the first SCS, the processor 701 may execute operation 1406.

FIG. 14 illustrates an example of executing operation 1404 after executing operation 1402, but this is for convenience of description. The processor 701 may execute operation 1404 before or during execution operation 1402. In other words, operation 1404 is illustrated in FIG. 14 as an operation executed after operation 1402 to represent that the processor 701 executes operation 1406 or operation 1408 according to the size of the SCS used for transmission of the user data and not illustrated to specify an execution order of the processor 701. For example, the processor 701 may identify whether the SCS used for transmitting the user data is the first SCS or the second SCS through a radio resource control (RC), identify whether the SCS used for transmitting the user data is the first SCS or the second SCS through a downlink (DCI) and identify whether the SCS used for transmitting the user data is the first SCS or the second SCS through a fallback caused by no transmission or reception for a certain period of time.

In operation 1406, based on identifying that the user data is transmitted based on the first SCS, the processor 701 may maintain the supply voltage of the PA 704 to be equal to or greater than a first voltage value in at least one slot before the identified slot. In an embodiment, the first voltage value may be a voltage value for the minimum transmit power of the uplink signal transmitted from the electronic device 101. However, it is not limited thereto.

In operation 1408, based on identifying that the user data is transmitted based on the second SCS, the processor 701 may maintain the supply voltage of the PA 704 to be equal to or greater than a second voltage value in the at least one slot. For example, the second voltage value may be the predetermined voltage value indicated by the description of FIGS. 7 to 10.

In operation 1410, the processor 701 may switch the supply voltage from the first voltage value or the second voltage value to a third voltage value corresponding to the transmit power identified in operation 1402.

For example, on the condition that the user data is transmitted based on the first SCS, the processor 701 may switch the supply voltage from a voltage value equal to or greater than the first voltage value to the third voltage value within a fifth duration from a first timing in another slot, which is a slot rightly before the identified slot among the at least one slot to a second timing in the identified slot. For example, the first timing in the other slot may be within at least one symbol in the other slot in which uplink control information such as DMRS and/or CQI is transmitted. For example, the second timing in the identified slot may be within a CP duration of the first symbol in the identified slot.

For another example, on a condition that the user data is transmitted based on the second SCS, the processor 701 may switch the supply voltage from a voltage value equal to or greater than the second voltage value to the third voltage value within a sixth duration from the third timing in the other slot to the fourth timing in the identified slot. For example, the third timing in the other slot may be in at least one symbol in the other slot in which uplink control information such as DMRS and/or CQI is transmitted. For example, the fourth timing in the identified slot may be within a CP duration of the first symbol in the identified slot. For example, the sixth duration from the third timing to the fourth timing may be shorter than the fifth duration from the first timing to the second timing. Since the sixth duration from the third timing to the fourth timing is shorter than the fifth duration from the first timing to the second timing, the electronic device 101 may prevent or reduce deterioration of communication quality in connection with transmitting the user data at the identified transmit power based on the second SCS.

In operation 1412, the processor 701 may transmit the user data to the base station with the identified transmit power within the identified slot, using the PA 704 operating based on the supply voltage switched to the third voltage value.

Figure 15:
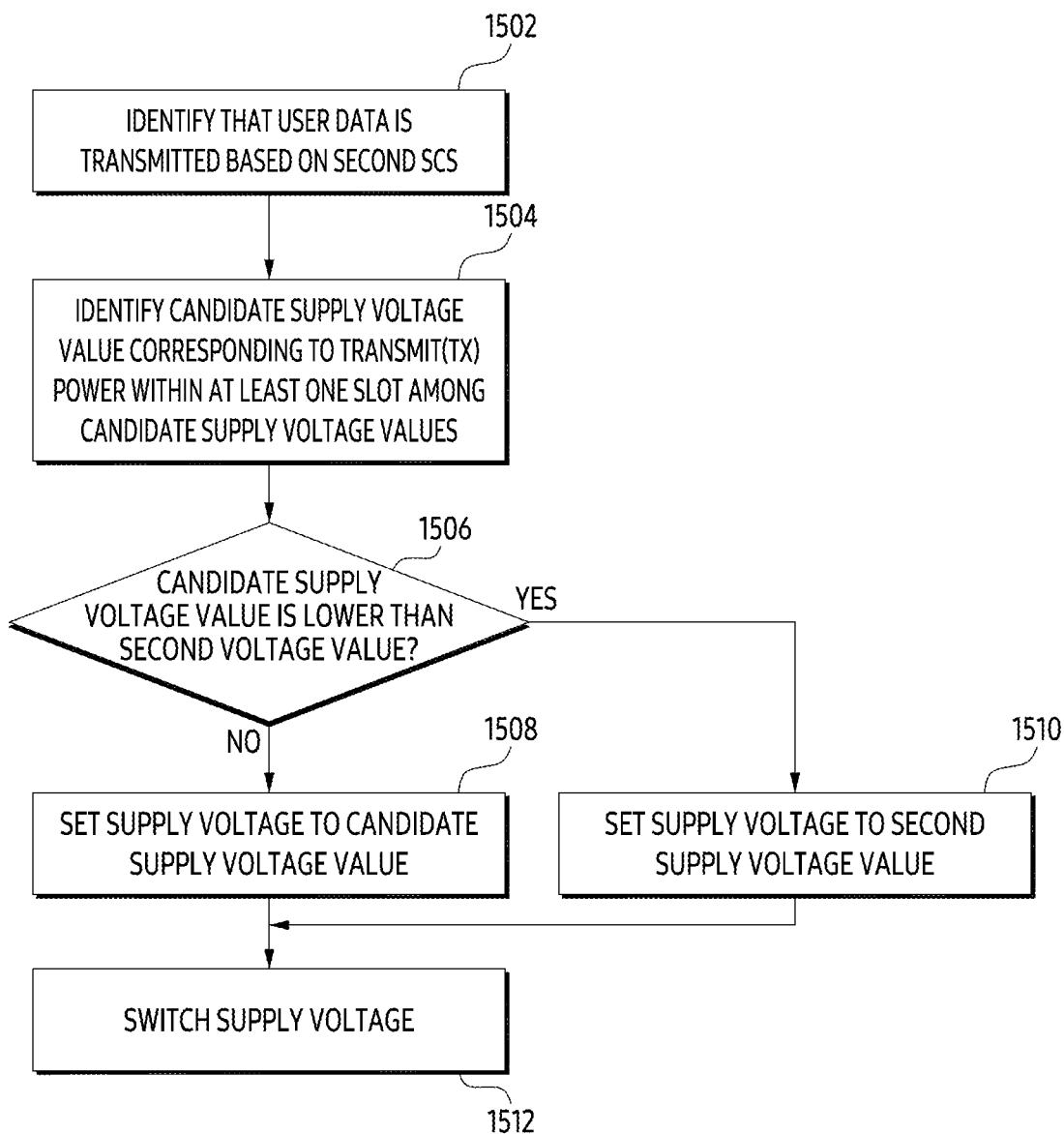
FIG. 15 is a flowchart illustrating a method of maintaining a supply voltage in at least one slot before a slot for transmitting user data through a comparison between reference data and a second voltage value, according to an example embodiment.

FIG. 15 is a flowchart illustrating a method of maintaining a supply voltage in at least one slot before a slot for transmitting user data through a comparison between reference data and a second voltage value, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 15, in operation 1502, the processor 701 may identify that the user data is transmitted based on the second SCS. For example, operation 1502 may correspond to identifying that the user data is transmitted based on the second SCS in operation 1404 illustrated in FIG. 14.

Although not shown in FIG. 15, in an embodiment, the processor 701 may bypass or refrain from controlling the supply voltage of the PA 704 based on the ET, and may execute operation 1504, in response to identifying that the user data is transmitted based on the second SCS, while the supply voltage of the PA 704 is controlled by the modulator 705 using a signal obtained based on envelope tracking (ET).

In operation 1504, the processor 701 may identify a candidate supply voltage value corresponding to the transmit power in the at least one slot before the slot identified in operation 1402 among candidate supply voltage values, included in the reference data, for minimizing or reducing power consumption by the PA 704 operating in the dynamic range. For example, the reference data may be expressed as shown in Table 2.

In operation 1506, the processor 701 may identify whether the candidate supply voltage value identified in operation 1504 is lower than the second voltage value. On a condition that the candidate supply voltage value is lower than the second voltage value, the processor 701 may execute operation 1510, and execute operation 1508 otherwise.

In operation 1508, the processor 701 may set the supply voltage to the candidate supply voltage value based on identifying that the candidate supply voltage value is equal to or higher than the second voltage value. Since the candidate supply voltage value equal to or higher than the second voltage value indicates that time for switching the supply voltage from the candidate supply voltage value to the third voltage value is secured, the processor 701 may set the supply voltage to the candidate supply voltage value. For example, the processor 701 may control the PA 704 based on average power tracking (APT) by bypassing or refraining from controlling the supply voltage of the PA 704 based on the ET and setting the supply voltage to the candidate supply voltage value.

In operation 1510, the processor 701 may set the supply voltage to the second voltage value based on identifying that the candidate supply voltage value is lower than the second voltage value. Since the candidate supply voltage value being lower than the second voltage value may indicate that communication quality may be deteriorated when switching the supply voltage from the candidate supply voltage value to the third voltage value, the processor 701 may set the supply voltage to the second voltage value higher than the candidate supply voltage value. For example, the processor 701 may control the PA 704 based on the APT by bypassing or refraining from controlling the supply voltage of the PA 704 based on the ET and setting the supply voltage to the above second voltage value.

In operation 1512, the processor 701 may switch the supply voltage from the second voltage value or the candidate supply voltage value to the third voltage value. For example, the processor 701 may maintain the supply voltage in the at least one slot above the second voltage value and may switch the supply voltage from the second voltage value to the third voltage value.

Figure 16:
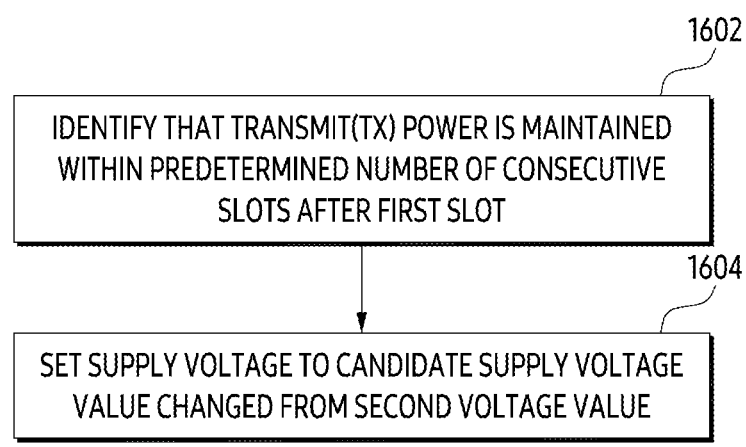
FIG. 16 is a flowchart illustrating a method of releasing maintenance of a supply voltage in a slot after a slot in which user data is transmitted, according to an example embodiment.

FIG. 16 is a flowchart illustrating a method of releasing maintenance of a supply voltage in a slot after a slot in which user data is transmitted, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Operations 1602 and 1604 of FIG. 16 may be executed after executing operation 1412 of FIG. 14.

Referring to FIG. 16, in operation 1602, the processor 701 may identify that transmit power is maintained within a predetermined number of consecutive slots after the first slot, which is a slot in which the user data is transmitted in operation 1412 of FIG. 14.

In operation 1604, the processor 701 may set the supply voltage of the PA 704 to a candidate supply voltage value changed from the second voltage value based on the identification in operation 1602. For example, since the transmit power maintained within the predetermined number of consecutive slots indicates that the probability that the transmit power is maintained in at least one slot after the slots is relatively high, the processor 701 may terminate maintaining the supply voltage above the second voltage value based on the above identification and set the supply voltage to the candidate supply voltage value lower than the second voltage value.

Figure 17:
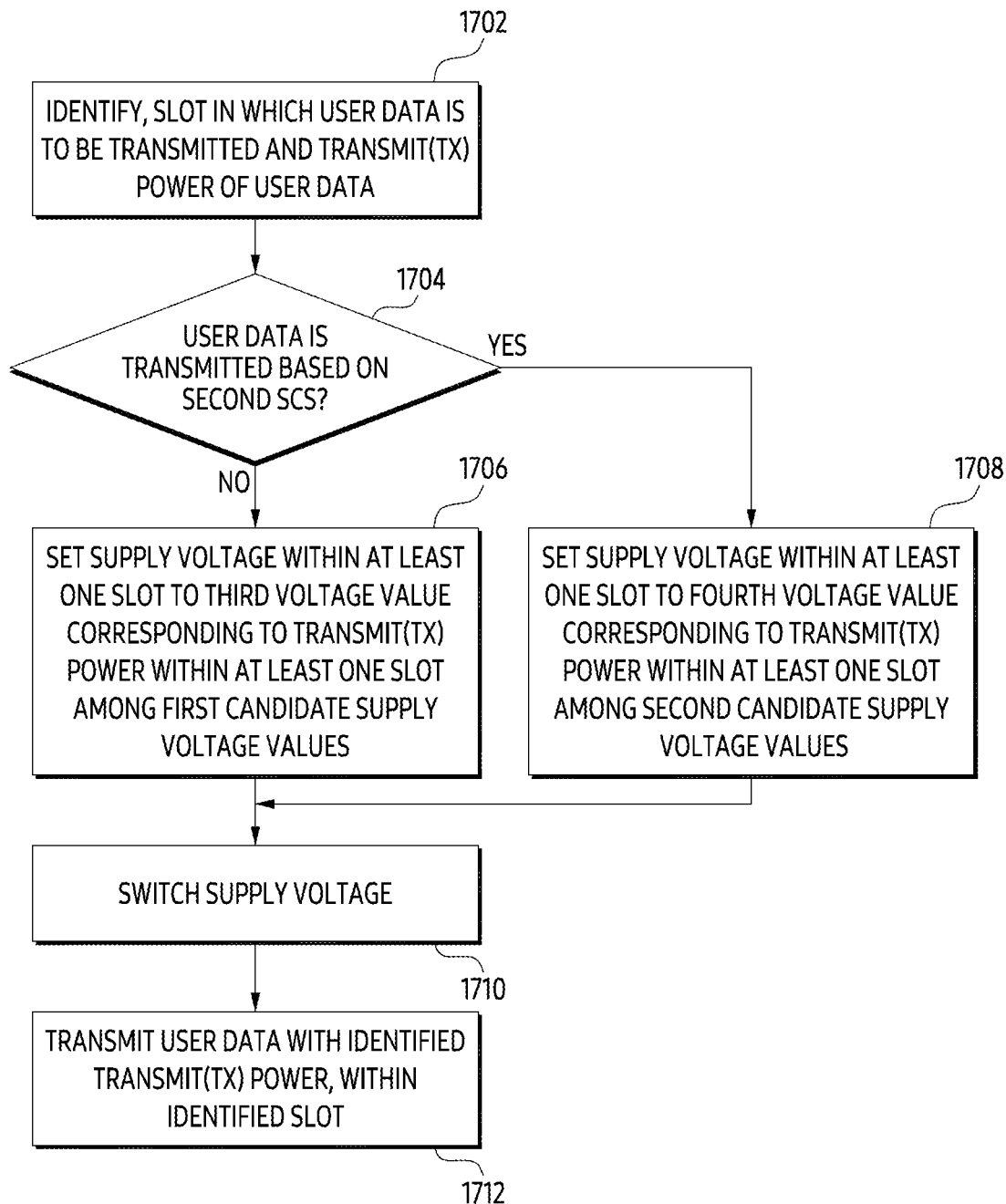
FIG. 17 is a flowchart illustrating a method of switching a supply voltage of a PA through first reference data for a first SCS and second reference data for a second SCS, according to an example embodiment.

FIG. 17 is a flowchart illustrating a method of switching a supply voltage of a PA through first reference data for a first SCS and second reference data for a second SCS, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 17, in operation 1702, the processor 701 may identify a slot in which user data is to be transmitted and transmit power of the user data based on the control information received from the base station. For example, operation 1702 may correspond to operation 1402 of FIG. 14.

In operation 1704, the processor 701 may identify whether the user data is transmitted based on the second SCS. For example, operation 1704 may correspond to operation 1404 of FIG. 14.

In operation 1706, based on identifying that the user data is transmitted based on the first SCS, the processor 701 may set a supply voltage in at least one slot before the slot identified in operation 1702 to a third voltage value corresponding to the transmit power in at least one slot among the first candidate voltage values in the first reference data. For example, the third voltage value may be greater than or equal to the first voltage value indicated through the description of FIG. 14.

In operation 1708, based on identifying that the user data is transmitted based on the second SCS, the processor 701 may set the supply voltage in the at least one slot to a fourth voltage value corresponding to the transmit power in the at least one slot among the second candidate voltage values in the second reference data. For example, the fourth voltage value may be greater than or equal to the second voltage value indicated through the description of FIG. 14.

In operation 1710, the processor 701 may switch the supply voltage from the third voltage value or the fourth voltage value to a voltage value corresponding to the transmit power identified in operation 1702.

In operation 1712, The processor 701 may transmit the user data, with the transmit power identified in operation 1702, to the base station, from the slot identified in operation 1702 using the PA 704, based on the supply voltage switched to the voltage value.

Figure 18:
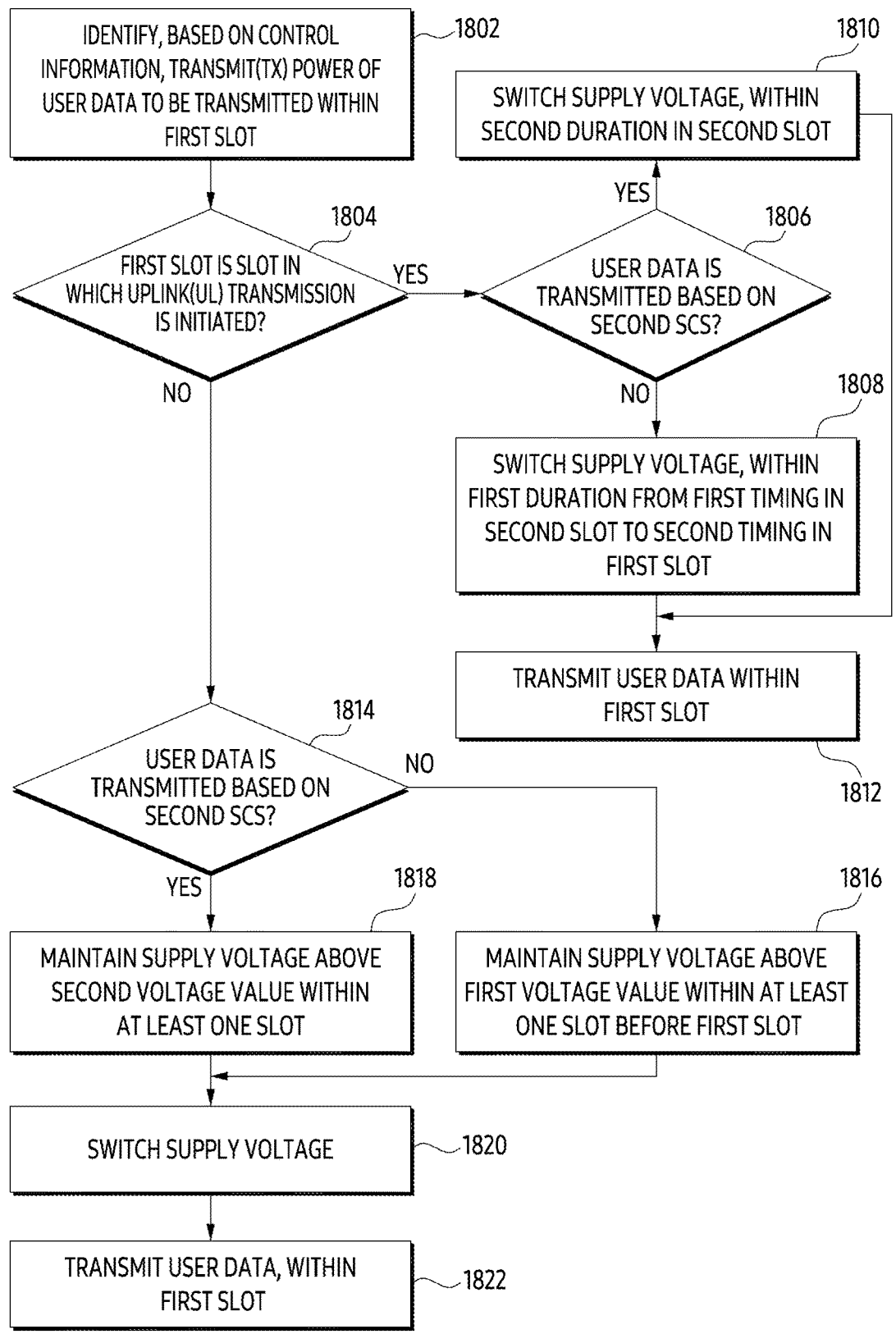
FIG. 18 is a flowchart illustrating an example method of switching a supply voltage according to whether a first slot in which user data is to be transmitted is a slot in which uplink transmission is initiated and whether an SCS for transmitting the user data is a second SCS.

FIG. 18 is a flowchart illustrating a method of switching a supply voltage according to whether a first slot in which user data is to be transmitted is a slot in which uplink transmission is initiated and whether an SCS for transmitting the user data is a second SCS. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7

Referring to FIG. 18, in operation 1802, the processor 701 may identify transmit power of user data to be transmitted in the first slot based on control information received from the base station. For example, the processor 701 may identify the first slot and the transmit power by identifying 'DCI format 0_0', 'DCI format 0_1', or 'DCI format 2_2' in the control information.

In operation 1804, the processor 701 may identify whether the first slot is a slot in which uplink transmission is initiated. On a condition that the first slot is a slot in which uplink transmission is initiated, the processor 701 may execute operation 1806, and on a condition that the first slot is not a slot in which uplink transmission is initiated and not a slot in which uplink transmission is terminated, the processor 701 may execute operation 1814.

In operation 1806, the processor 701 may identify whether the user data is transmitted based on the second SCS based on identifying that the first slot is a slot in which an uplink transmission is initiated. On a condition that the user data is transmitted based on the second SCS, the processor 701 may execute operation 1810 and otherwise execute operation 1808.

In operation 1808, based on identifying that the user data is transmitted based on the first SCS distinguish from the second SCS, the processor 701 may switch the supply voltage, within a first duration from a first timing in the second slot rightly before the first slot to a second timing in the first slot. For example, the first duration from the first timing to the second timing may be the first duration indicated through the description of operation 1106 of FIG. 11.

In operation 1810, based on identifying that the user data is transmitted based on the second SCS, the processor 701 may switch the supply voltage in a second duration in the second slot before the first slot is initiated. For example, the second duration in the second slot may be the second duration indicated through the description of operation 1108 of FIG. 11

In operation 1812, the processor 701 may transmit the user data with the transmit power in the first slot, using the PA 704 operating based on the supply voltage switched to a voltage value corresponding to the transmit power through operation 1808 or operation 1810.

In operation 1814, based on identifying that the first slot is not a slot in which an uplink transmission is initiated, and the first slot is not a slot in which an uplink transmission is terminated, the processor 701 may identify whether the user data is transmitted based on the second SCS. On a condition that the user data is transmitted based on the second SCS, the processor 701 may execute operation 1818 and otherwise execute operation 1816.

In operation 1816, based on identifying that the user data is transmitted based on the first SCS distinguish from the second SCS, the processor 701 may maintain the supply voltage above a first voltage value in at least one slot before the first slot. For example, the first voltage value may be the first voltage value indicated through the description of operation 1406 of FIG. 14.

In operation 1818, based on identifying that the user data is transmitted based on the second SCS, the processor 701 may maintain the supply voltage above a second voltage value in the at least one slot before the first slot. For example, the second voltage value may be the second voltage value indicated through the description of operation 1408 of FIG. 14.

In operation 1820, the processor 701 may switch the supply voltage maintained above the first voltage value or above the second voltage value to a voltage value corresponding to the transmit power.

In operation 1822, the processor 701 may transmit the user data with the transmit power in the first slot using the PA 704 operating based on the supply voltage switched to the voltage value corresponding to the transmit power.

Figure 19:
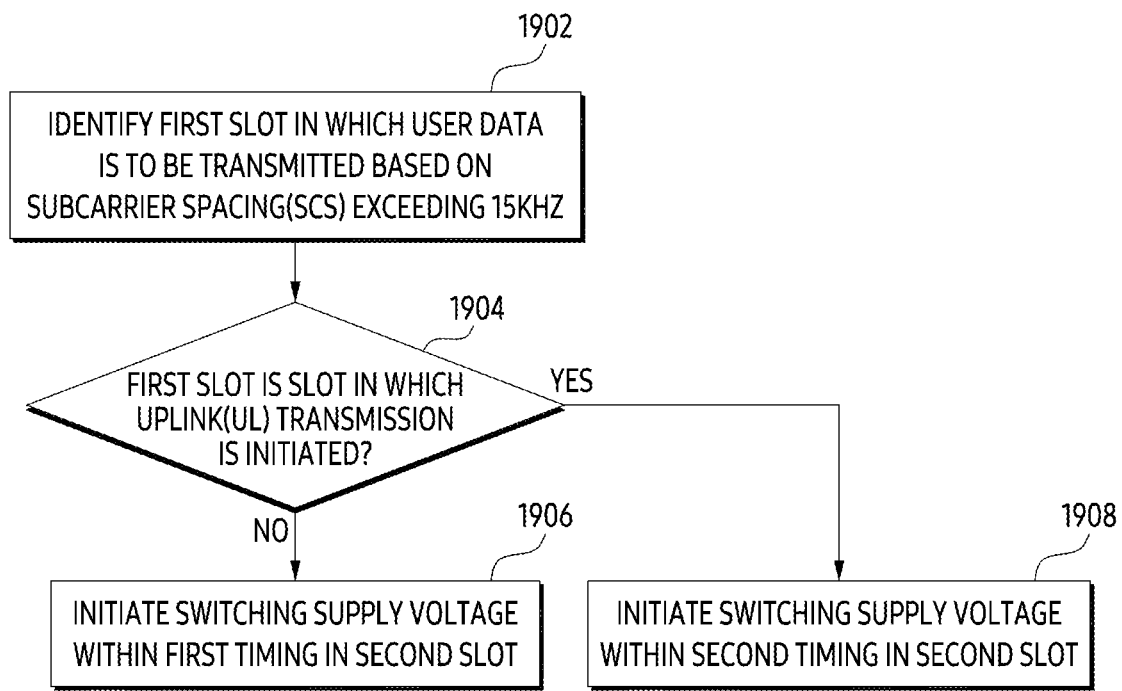
FIG. 19 is a flowchart illustrating an example method of changing a timing for initiating to switch supply switching according to whether a slot in which user data is transmitted is a slot in which uplink transmission is initiated, according to an example embodiment.

FIG. 19 is a flowchart illustrating a method of changing a timing for initiating to switch supply switching according to whether a slot in which user data is transmitted is a slot in which uplink transmission is initiated, according to an embodiment. This method may be performed by the electronic device 101 shown in FIG. 1, the electronic device 101 shown in FIG. 7, the processor 120 of the electronic device 101 shown in FIG. 1, or the processor 701 of the electronic device 101 shown in FIG. 7.

Referring to FIG. 19, in operation 1902, based on the control information received from the base station, the processor 701 may identify a first slot to be transmitted based on an SCS (e.g., the second SCS) in which user data exceeds 15 kHz.

In operation 1904, the processor 701 may identify whether the first slot is a slot in which uplink transmission is initiated. The processor 701 may execute operation 1908 on a condition that the first slot is a slot in which uplink transmission is initiated, and may execute operation 1906 on a condition that the first slot is not a slot in which uplink transmission is initiated.

In operation 1906, based on identifying that the first slot is not a slot in which an uplink transmission is initiated, the processor 701 may initiate switching the supply voltage to a voltage value corresponding to the transmit power at a first timing in a second slot rightly before the first slot. For example, the first timing may be in at least one symbol in the second slot in which uplink control information such as DMRS and/or CQI is transmitted. However, it is not limited thereto.

In operation 1908, based on identifying that the first slot is a slot in which an uplink transmission is initiated, the processor 701 may initiate switching the supply voltage to a voltage value corresponding to the transmit power at a second timing in the second slot before the first timing. For example, since the second slot is not used for uplink transmission, the second timing may be before the first timing.

Although not shown in FIG. 19, in an example embodiment, the processor 701 may further identify whether the first slot is a slot in which uplink transmission is terminated in operation 1904. In this case, the processor 701 may execute operation 1908 on a condition that the first slot is a slot in which uplink transmission is initiated, initiate switching the supply voltage at a third timing in a third slot rightly after the first slot on the condition that the first slot is a slot where uplink transmission is terminated, and execute operation 1906 on a condition that the first slot is not a slot in which uplink transmission is initiated and the first slot is not a slot in which uplink transmission is terminated.

According to an example embodiment, an electronic device and a method can reduce a duration for setting a transmit power of an uplink signal by changing a timing to initiate switching a supply voltage for a dynamic range of a power amplifier (PA) according to subcarrier spacing (SCS) or maintaining the supply voltage above a predetermined voltage value.

As described above, according to an example embodiment, an electronic device (e.g., electronic device 101) may comprise an antenna (e.g., antenna 703), a power amplifier (PA) (e.g. PA 704) connected with the antenna and at least one processor (e.g., processor 701), operably coupled with the PA, configured to identify, based on control information received from a base station, transmit (Tx) power of user data to be transmitted within a first slot in which uplink (UL) transmission is initiated; switch, based on identifying that the user data is transmitted based on a first subcarrier spacing (SCS), supply voltage for dynamic range of the PA to a voltage value corresponding to the Tx power, within first duration from first timing in a second slot rightly before the first slot to second timing in the first slot; switch, based on identifying that the user data is transmitted based on a second SCS greater than the first SCS, the supply voltage to the voltage value, within second duration in the second slot, the second duration in the second slot being before an initiation of the first slot; and transmit, using the PA operating based on the supply voltage switched to the voltage value, the user data with the Tx power within the first slot, to the base station.

For example, the at least one processor may be further configured to identify, based on control information received from the base station, that UL transmission is ceased within a third slot for transmission of another user data; and switch, based on identifying that the other user data is transmitted based on the second SCS, the supply voltage to another voltage value for turn-off of Tx power, within third duration in a fourth slot rightly after the third slot. For example, the at least one processor may be further configured to switch, based on identifying that the other user data is transmitted based on the first SCS, the supply voltage to the other voltage value, within fourth duration from third timing in the third slot to fourth timing in the fourth slot. For example, a start timing of the third duration in the fourth slot may be start timing of the fourth slot.

For example, an end timing of the second duration in the second slot may be end timing of the second slot.

For example, the at least one processor may be further configured to switch, based on identifying that the user data is transmitted based on the second SCS and the voltage value corresponding to the Tx power is higher than a reference voltage value, the supply voltage to the voltage value within the second duration in the second slot; and switch, based on identifying that the user data is transmitted based on the second SCS and the voltage value corresponding to the Tx power is lower than or equal to the reference voltage value, the supply voltage to the voltage value within the first duration from the first timing to the second timing.

For example, the second timing in the first slot may be within cyclic prefix (CP) duration in a start symbol among symbols in the first slot.

For example, the at least one processor may be further configured to identify, based on control information received from the base station, a third slot in which another user data is to be transmitted and another Tx power of the other user data; maintain, based on identifying that the other user data is transmitted based on the first SCS, the supply voltage above a first voltage value, within at least one slot between the first slot and the third slot; maintain, based on identifying that the other user data is transmitted based on the second SCS, the supply voltage above a second voltage value higher than the first voltage value, within the at least one slot; switch the supply voltage that is maintained above the first voltage value or the second voltage value to a third voltage value corresponding to the other Tx power; and transmit, using the PA operating based on the supply voltage switched to the third voltage value, the other user data with the other Tx power within the third slot, to the base station. For example, the at least one processor may be further configured to switch, based on identifying that the other user data is transmitted based on the first SCS, the supply voltage to the third voltage value, within third duration from third timing in a fourth slot rightly before the third slot among the at least one slot to fourth timing in the third slot; and switch, based on identifying that the other user data is transmitted based on the second SCS, the supply voltage to the third voltage value, within fourth duration from fifth timing in the fourth slot to sixth timing in the third slot. For example, the fourth duration from the fifth timing to the sixth timing may be shorter than the third duration from the third timing to the fourth timing.

As described above, according to an embodiment, an electronic device (e.g. electronic device 101) may comprise an antenna (e.g. antenna 703), a power amplifier (PA) (e.g. PA 704) operably coupled with the antenna and at least one processor (e.g. processor 701), operably coupled with the PA, configured to identify, based on control information received from a base station, a slot in which user data is to be transmitted and transmit (Tx) power of the user data; maintain, based on identifying that the user data is transmitted based on a first subcarrier spacing (SCS), supply voltage for dynamic range of the PA above a first voltage value, within at least one slot before the slot; maintain, based on identifying that the user data is transmitted based on a second SCS greater than the first SCS, the supply voltage above a second voltage value higher than the first voltage value; switch the supply voltage that is maintained above the first voltage value or the second voltage value to a third voltage value corresponding to the Tx power; and transmit, using the PA operating based on the supply voltage switched to the third voltage value, the user data with the Tx power within the slot, to the base station.

For example, the slot may be a first slot, and wherein the at least one processor may be configured to switch, based on identifying that the user data is transmitted based on the first SCS, the supply voltage to the third voltage value, within first duration from first timing in a second slot to second timing in the first slot, wherein the second slot is a slot rightly before the first slot among the at least one slot; and switch, based on identifying that the user data is transmitted based on the second SCS, the supply voltage to the third voltage value, within second duration from third timing in the second slot to fourth timing in the first slot. For example, the second duration from the third timing to the fourth timing may be shorter than the first duration from the first timing to the second timing. For example, each of the second timing in the first slot and the fourth timing in the first slot may be within cyclic prefix (CP) duration in a start symbol among symbols in the first slot.

For example, the electronic device may further comprise at least one memory (e.g., memory 130), operably coupled with the at least one processor, configured to store reference data including candidate supply voltage values for minimizing or reducing power consumption by the PA operated within the dynamic range, wherein the slot may be a first slot, and wherein the at least one processor may be further configured to identify a candidate supply voltage value corresponding to transmit (Tx) power within the at least one slot among the candidate supply voltage values; set, based on identifying that the user data is transmitted based on the second SCS and the candidate supply voltage value is lower than the second voltage value, the supply voltage within the at least one slot to the second voltage value; set, based on identifying that the user data is transmitted based on the second SCS and the candidate supply voltage value is higher than or equal to the second voltage value, the supply voltage within the at least one slot to the candidate supply voltage value; and switch, based on identifying that the user data is transmitted based on the second SCS, the supply voltage from the second voltage value or the candidate supply voltage value to the third voltage value. For example, the at least one processor may be further configured to set, based on identifying that Tx power is maintained within a predetermined number of consecutive slots after the first slot, the supply voltage to the candidate supply voltage value changed from the third voltage value.

For example, the electronic device may further comprise a modulator connected with each of the at least one processor and the PA, wherein the at least one processor may be further configured to bypass to set the supply voltage through the modulator based on a signal obtain based on an envelope tracking (ET) with respect to at least one slot after the slot, and wherein the at least one slot may be a slot in which another user data is to be transmitted based on the second SCS.

For example, the electronic device may further comprise at least one memory, operably coupled with the at least one processor, configured to store first reference data for the first SCS including first candidate supply voltage values for minimizing or reducing power consumption by the PA operated within the dynamic range and second reference data for the second SCS including second candidate supply voltage values for minimizing or reducing power consumption by the PA operated within the dynamic range, wherein the at least one processor may be configured to set, based on identifying that the user data is transmitted based on the first SCS, the supply voltage within the at least one slot to a third voltage value corresponding to Tx power within the at least one slot among the first supply voltage values; and set, based on identifying that the user data is transmitted based on the second SCS, the supply voltage within the at least one slot to a fourth voltage value corresponding to the Tx power within the at least one slot among the second supply voltage values, wherein the third voltage value may be above the first voltage value, and wherein the fourth voltage value may be above the second voltage value. For example, the second reference data may be set based on a range of transmit power of user data that the base station may change and the second voltage value.

For example, the transmit power and the slot may be indicated through a transmit power control (TPC) command in the control information.

As described above, according to an embodiment, an electronic device (e.g. electronic device 101) may comprise an antenna (e.g. antenna 703), a power amplifier (PA) (e.g. PA 704) operably coupled with the antenna and at least one processor (e.g. processor 701), operably coupled with the PA, configured to identify, based on control information received from a base station, a first slot in which user data is to be transmitted based on a subcarrier spacing (SCS) exceeding 15 kilo hertz (kHz); initiate switching supply voltage for dynamic range of the PA to a voltage value corresponding to transmit (Tx) power of the user data at a first timing in a second slot rightly before the first slot on a condition that the first slot is not a slot in which uplink (UL) transmission is initiated; and initiate switching the supply voltage to the voltage value corresponding to the Tx power at a second timing in the second slot on a condition that the first slot is a slot UL transmission is initiated, wherein the second timing in the second slot is before the first timing.

As described above, according to an example embodiment, a method for operating an electronic device including an antenna, a power amplifier (PA) connected with the antenna may comprise identifying, based on control information received from a base station, transmit (Tx) power of user data to be transmitted within a first slot in which uplink (UL) transmission is initiated; switching, based on identifying that the user data is transmitted based on a first subcarrier spacing (SCS), supply voltage for dynamic range of the PA to a voltage value corresponding to the Tx power, within first duration from first timing in a second slot rightly before the first slot to second timing in the first slot; switching, based on identifying that the user data is transmitted based on a second SCS greater than the first SCS, the supply voltage to the voltage value, within second duration in the second slot, the second duration in the second slot being before an initiation of the first slot; and transmitting, using the PA operating based on the supply voltage switched to the voltage value, the user data with the Tx power within the first slot, to the base station.

As described above, according to an example embodiment, a method for operating an electronic device including an antenna, a power amplifier (PA) connected with the antenna may comprise identifying, based on control information received from a base station, a slot in which user data is to be transmitted and transmit (Tx) power of the user data; maintaining, based on identifying that the user data is transmitted based on a first subcarrier spacing (SCS), supply voltage for dynamic range of the PA above a first voltage value, within at least one slot before the slot; maintaining, based on identifying that the user data is transmitted based on a second SCS greater than the first SCS, the supply voltage above a second voltage value higher than the first voltage value; switching the supply voltage that is maintained above the first voltage value or the second voltage value to a third voltage value corresponding to the Tx power; and transmitting, using the PA operating based on the supply voltage switched to the third voltage value, the user data with the Tx power within the slot, to the base station.

As described above, according to an example embodiment, a method for operating an electronic device including an antenna, a power amplifier (PA) connected with the antenna may comprise identifying, based on control information received from a base station, a first slot in which user data is to be transmitted based on a subcarrier spacing (SCS) exceeding 15 kilo hertz (kHz); initiating switching supply voltage for dynamic range of the PA to a voltage value corresponding to transmit (Tx) power of the user data at a first timing in a second slot rightly before the first slot on a condition that the first slot is not a slot in which uplink (UL) transmission is initiated; and initiating switching the supply voltage to the voltage value corresponding to the Tx power at a second timing in the second slot on a condition that the first slot is a slot UL transmission is initiated, wherein the second timing in the second slot is before the first timing.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   an antenna;
   a power amplifier (PA) electrically connected with the antenna;
   memory comprising one or more storage media storing instructions; and
   at least one processor comprising processing circuitry,
   wherein the instructions, when executed by the at least one processor individually and/or collectively, cause the electronic device to:
      identify, based on control information received from a base station, a transmit (Tx) power of user data to be transmitted within a first slot in which uplink (UL) transmission is to be initiated;
      based on identifying that the user data is transmitted based on a first subcarrier spacing (SCS), adjust a supply voltage for dynamic range of the PA to a voltage value corresponding to the Tx power, within a first time interval from a first timing in a second slot rightly before the first slot to a second timing in the first slot;
      based on identifying that the user data is transmitted based on a second SCS greater than the first SCS, adjust the supply voltage to the voltage value, within a second time interval in the second slot, the second time interval in the second slot being before an initiation of the first slot; and
      transmit, using the PA operating based on the supply voltage adjusted to the voltage value, the user data with the Tx power within the first slot, to the base station.

2. The electronic device of claim 1, wherein the instructions, when executed by the at least one processor, cause the electronic device to:
   based on control information received from the base station, identify that UL transmission is ceased within a third slot for transmission of another user data; and
   based on identifying that the other user data is transmitted based on the second SCS, adjust the supply voltage to another voltage value for turn-off of Tx power, within a third time interval in a fourth slot rightly after the third slot.

3. The electronic device of claim 2, wherein the instructions, when executed by the at least one processor, cause the electronic device to, based on identifying that the other user data is transmitted based on the first SCS, adjust the supply voltage to the other voltage value, within a fourth time interval from a third timing in the third slot to a fourth timing in the fourth slot.

4. The electronic device of claim 2, wherein a start timing of the third time interval in the fourth slot is a start timing of the fourth slot.

5. The electronic device of claim 1, wherein an end timing of the second time interval in the second slot is an end timing of the second slot.

6. The electronic device of claim 1, wherein the instructions, when executed by the at least one processor, cause the electronic device to:
   based on identifying that the user data is transmitted based on the second SCS and the voltage value corresponding to the Tx power is higher than a reference voltage value, adjust the supply voltage to the voltage value within the second time interval in the second slot; and based on identifying that the user data is transmitted based on the second SCS and the voltage value corresponding to the Tx power is lower than the reference voltage value, adjust the supply voltage to the voltage value within the first time interval from the first timing to the second timing.

7. The electronic device of claim 1, wherein the second timing in the first slot is within a cyclic prefix (CP) interval in a start symbol among symbols in the first slot.

8. The electronic device of claim 1, wherein the instructions, when executed by the at least one processor, cause the electronic device to:
   based on control information received from the base station, identify a third slot in which another user data is to be transmitted, and another Tx power of the other user data;
   based on identifying that the other user data is transmitted based on the first SCS, maintain the supply voltage above a first voltage value, within at least one slot between the first slot and the third slot;
   based on identifying that the other user data is transmitted based on the second SCS, maintain the supply voltage above a second voltage value higher than the first voltage value, within the at least one slot;
   adjust the supply voltage that is maintained above the first voltage value or the second voltage value to a third voltage value corresponding to the other Tx power; and
   transmit, using the PA operating based on the supply voltage adjusted to the third voltage value, the other user data with the other Tx power within the third slot, to the base station.

9. The electronic device of claim 8, wherein the instructions, when executed by the at least one processor, cause the electronic device to:
   based on identifying that the other user data is transmitted based on the first SCS, adjust the supply voltage to the third voltage value, within a third time interval from a third timing in a fourth slot rightly before the third slot among the at least one slot to a fourth timing in the third slot; and
   based on identifying that the other user data is transmitted based on the second SCS, adjust the supply voltage to the third voltage value, within a fourth time interval from a fifth timing in the fourth slot to a sixth timing in the third slot.

10. The electronic device of claim 9, wherein the fourth time interval from the fifth timing to the sixth timing is shorter than the third time interval from the third timing to the fourth timing.

11. An electronic device comprising:
    an antenna;
    a power amplifier (PA) electrically connected to the antenna;
    memory comprising one or more storage media storing instructions; and
    at least one processor comprising processing circuitry,
    wherein the instructions, when executed by the at least one processor individually and/or collectively, cause the electronic device to:
       based on control information received from a base station, identify a slot in which user data is to be transmitted, and a transmit (Tx) power of the user data;
       based on identifying that the user data is transmitted based on a first subcarrier spacing (SCS), maintain a supply voltage for dynamic range of the PA above a first voltage value, within at least one slot before the slot;

based on identifying that the user data is transmitted based on a second SCS greater than the first SCS, maintain the supply voltage above a second voltage value higher than the first voltage value;

adjust the supply voltage that is maintained above the first voltage value or the second voltage value to a third voltage value corresponding to the Tx power; and transmit, using the PA operating based on the supply voltage adjusted to the third voltage value, the user data with the Tx power within the slot, to the base station.

12. The electronic device of claim 11, wherein the slot is a first slot, and wherein the instructions, when executed by the at least one processor, cause the electronic device to:

based on identifying that the user data is transmitted based on the first SCS, adjust the supply voltage to the third voltage value, within a first time interval from a first timing in a second slot to a second timing in the first slot, wherein the second slot is a slot rightly before the first slot among the at least one slot; and based on identifying that the user data is transmitted based on the second SCS, adjust the supply voltage to the third voltage value, within a second time interval from a third timing in the second slot to a fourth timing in the first slot.

13. The electronic device of claim 12, wherein the second time interval from the third timing to the fourth timing is shorter than the first time interval from the first timing to the second timing.

14. The electronic device of claim 13, wherein each of the second timing in the first slot and the fourth timing in the first slot is within a cyclic prefix (CP) interval in a start symbol among symbols in the first slot.

15. The electronic device of claim 11, wherein the memory stores reference data including candidate supply voltage values for reducing power consumption by the PA operated within the dynamic range, wherein the slot is a first slot, and wherein the instructions, when executed by the at least one processor, cause the electronic device to:

identify a candidate supply voltage value corresponding to a transmit (Tx) power within the at least one slot among the candidate supply voltage values;

based on identifying that the user data is transmitted based on the second SCS and the candidate supply voltage value is lower than the second voltage value, set the supply voltage within the at least one slot to the second voltage value;

based on identifying that the user data is transmitted based on the second SCS and the candidate supply voltage value is higher than the second voltage value, set the supply voltage within the at least one slot to the candidate supply voltage value; and based on identifying that the user data is transmitted based on the second SCS, adjust the supply voltage from the second voltage value or the candidate supply voltage value to the third voltage value.

16. The electronic device of claim 15, wherein the instructions, when executed by the at least one processor, cause the electronic device to, based on identifying that a Tx power is maintained within a predetermined number of consecutive slots after the first slot, adjust the supply voltage from the third voltage value to the candidate supply voltage value.

17. The electronic device of claim 11, further comprising: a modulator, associated with the PA, comprising circuitry, wherein the instructions, when executed by the at least one processor, cause the electronic device to bypass to set the supply voltage through the modulator based on a signal obtain based on an envelope tracking (ET) with respect to at least one slot after the slot, and wherein the at least one slot after the slot is a slot in which another user data is to be transmitted based on the second SCS.

18. The electronic device of claim 11, wherein the memory stores first reference data for the first SCS including first candidate supply voltage values for reducing power consumption by the PA operated within the dynamic range and second reference data for the second SCS including second candidate supply voltage values for reducing power consumption by the PA operated within the dynamic range, wherein the instructions, when executed by the at least one processor, cause the electronic device to:

based on identifying that the user data is transmitted based on the first SCS, set the supply voltage within the at least one slot to a third voltage value corresponding to a Tx power within the at least one slot among the first supply voltage values; and based on identifying that the user data is transmitted based on the second SCS, set the supply voltage within the at least one slot to a fourth voltage value corresponding to the Tx power within the at least one slot among the second supply voltage values, wherein the third voltage value is above the first voltage value, and wherein the fourth voltage value is above the second voltage value.

19. The electronic device of claim 11, wherein the Tx power and the slot are indicated through a transmit power control (TPC) command in the control information.

20. An electronic device comprising:

an antenna;

a power amplifier (PA) electrically connected to the antenna;

memory comprising one or more storage media storing instructions; and at least one processor comprising processing circuitry, wherein the instructions, when executed by the at least one processor individually and/or collectively, cause the electronic device to:

based on control information received from a base station, identify a first slot in which user data is to be transmitted based on a subcarrier spacing (SCS) exceeding 15 kilo hertz (kHz);

initiate adjusting a supply voltage for dynamic range of the PA to a voltage value corresponding to a transmit (Tx) power of the user data at a first timing in a second slot rightly before the first slot on a condition that the first slot is not a slot in which uplink (UL) transmission is initiated; and initiate adjusting the supply voltage to the voltage value corresponding to the Tx power at a second timing in the second slot on a condition that the first slot is a slot UL transmission is initiated, wherein the second timing in the second slot is before the first timing.

* * * * *